United States Patent
Michaelis et al.

(10) Patent No.: US 8,469,549 B2
(45) Date of Patent: Jun. 25, 2013

(54) BEAM SHAPER

(75) Inventors: Dirk Michaelis, Jena (DE); Christoph Wachter, Jena (DE); Norbert Danz, Jena (DE); Sergey Kudaev, Jena (DE); Michael Flaemmich, Jena (DE)

(73) Assignee: Fraunhofer-Gesellschaft zur Foerderung der Angewandten Forschung e.V., Munich (DE)

( * ) Notice: Subject to any disclaimer, the term of this patent is extended or adjusted under 35 U.S.C. 154(b) by 0 days.

(21) Appl. No.: 13/248,265

(22) Filed: Sep. 29, 2011

(65) Prior Publication Data
US 2012/0106164 A1 May 3, 2012

Related U.S. Application Data

(63) Continuation of application No. PCT/EP2010/054446, filed on Apr. 1, 2010.

(30) Foreign Application Priority Data

Apr. 3, 2009 (DE) .................... 10 2009 016 234

(51) Int. Cl.
*F21V 7/00* (2006.01)
(52) U.S. Cl.
USPC ............ 362/308; 362/311.01; 362/326
(58) Field of Classification Search
USPC ............ 362/308, 311.01, 311.02, 326, 328
See application file for complete search history.

(56) References Cited

U.S. PATENT DOCUMENTS

| | | | |
|---|---|---|---|
| 5,165,186 | A | 11/1992 | Smith |
| 5,439,621 | A | 8/1995 | Hoopman |
| 5,537,492 | A | 7/1996 | Nakajima et al. |
| 5,610,390 | A | 3/1997 | Miyano |
| 6,829,087 | B2 | 12/2004 | Freese et al. |
| 7,706,073 | B2 | 4/2010 | Munro |
| 2002/0145797 | A1 | 10/2002 | Sales |
| 2006/0291065 | A1 | 12/2006 | Hasei et al. |
| 2007/0002452 | A1 | 1/2007 | Munro |

FOREIGN PATENT DOCUMENTS

| | | |
|---|---|---|
| EP | 1 041 405 A1 | 10/2000 |
| JP | 05-333398 A | 12/1993 |
| JP | 2009-500663 A | 1/2009 |
| WO | 99/36830 A2 | 7/1999 |
| WO | 02/077672 A2 | 10/2002 |

OTHER PUBLICATIONS

Official Communication issued in International Patent Application No. PCT/EP2010/054446, mailed on Jun. 15, 2010.
English translation of Official Communication issued in corresponding International Application PCT/EP2010/054446, mailed on Nov. 10, 2011.
Official Communication issued in corresponding Japanese Patent Application No. 2012-502700, mailed on Mar. 26, 2013.

*Primary Examiner* — Stephen F Husar
*Assistant Examiner* — Meghan Dunwiddie
(74) *Attorney, Agent, or Firm* — Keating & Bennett, LLP

(57) ABSTRACT

A beam shaper according to an embodiment of the present invention for a light source arrangement for generating a radiation profile includes a multitude of adjacently arranged optical beam-shaping elements, each belonging to one type of a plurality of different types with different optical characteristics. When illuminated together, the beam-shaping elements effect the radiation profile of the beam shaper and each include an intensity-modulating element and a refractive element.

20 Claims, 21 Drawing Sheets

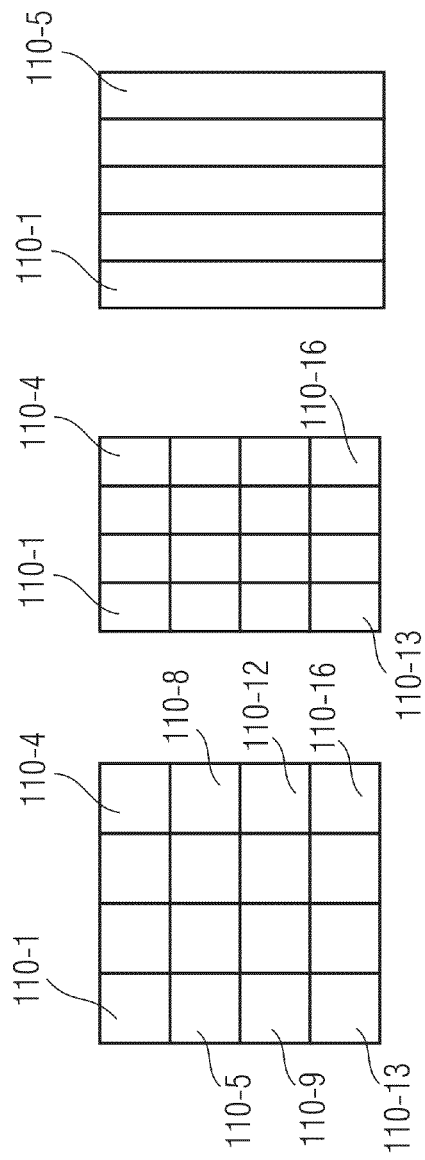
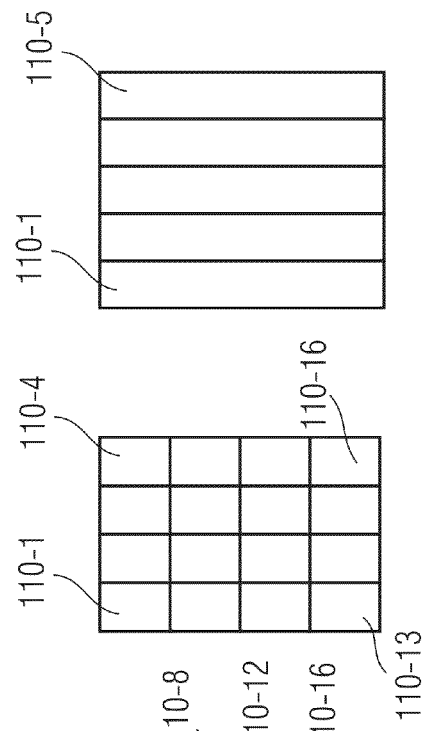
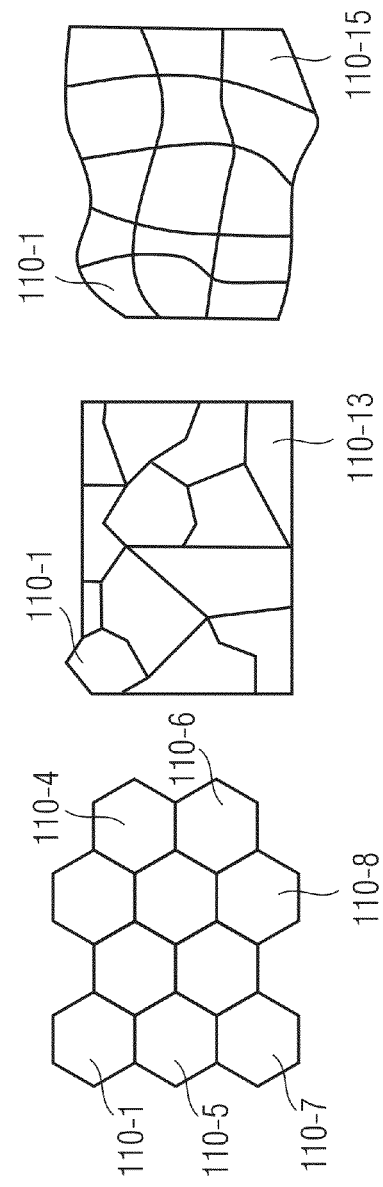
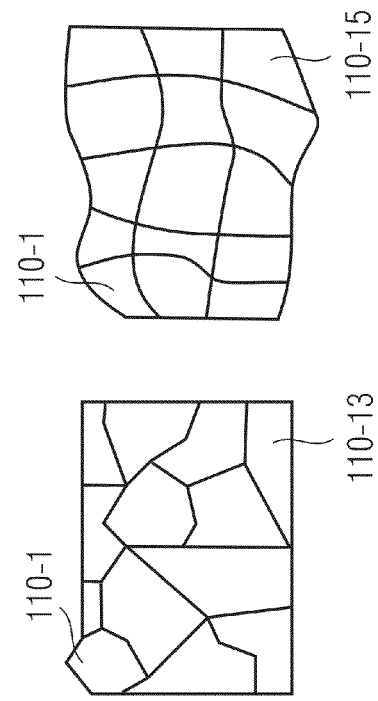
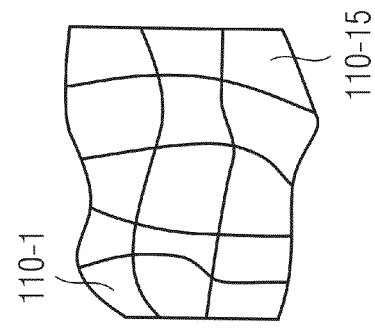

BEAM SHAPER

CROSS-REFERENCE TO RELATED APPLICATIONS

This application is a continuation of copending International Application No. PCT/EP2010/054446, filed Apr. 1, 2010, which is incorporated herein by reference in its entirety, and additionally claims priority from German Application No. DE 102009016234.8 filed Apr. 3, 2009, which is incorporated herein by reference in its entirety.

BACKGROUND OF THE INVENTION

Embodiments of the present invention relate to beam shapers that are used, for example, in the field of illuminations and projective displays.

In many technical applications, compact illumination means are used nowadays that are, for example, part of a projective display or a projective display element. Here, projection areas associated with the respective device can be used as projection areas, such as a diffusely scattering projection screen, or also external projection areas can be used, for example a (diffusely) scattering wall of a room. Also, respective illuminations are used in further technical applications.

In many of these applications, light beams are generated by controlling individual or several light sources in different implementations, which are then parallelized by means of a collimator. By specifically controlling respective light sources, different pieces of information can be displayed on the respective projection area.

In many cases, collimation optics, i.e. optics for parallelization of beams of, for example, area light sources based on pyramid arrays or lens arrays have been used to obtain a directional beam profile. Here, the collimation characteristic, i.e. parallelization of beams emitted by the one or several light sources, is in the foreground.

US 2007/0002452 A1 describes, for example, a collimation microlens arrangement for usage with a background illumination display comprising a substrate and a plurality of microlenses at an output side of the substrate. A mirror-like reflective layer on the side of the substrate opposing the microlenses and the plurality of apertures in the reflective layer having direct correspondence with the microlenses of the lens arrangement are further included in the arrangement. Further, US 2007/0002452 A1 describes a production method where the apertures are generated in a self-aligned manner to with the microlenses illuminating the output side of the arrangement by laser light, such that laser light is focussed on the layer of the aperture by the small lenses of the lens arrangement. Thereby, holes or apertures are ablated into the respective layer.

Thus, 2007/0002452 describes a collimation microlens arrangement and a method for its production, where the production method just described generates a radiation profile, which is as even as possible, as is desirable for collimation optics. However, respective collimation microlens arrangements hardly allow generation of more complex radiation profiles.

SUMMARY

According to an embodiment, a beam shaper for a light source arrangement for generating a radiation profile may have: a multitude of adjacently arranged optical beam-shaping elements, wherein the beam-shaping elements each belong to one type of a plurality of different types with different optical characteristics; wherein the beam-shaping elements, when illuminated together, effect the radiation profile of the beam shaper; and wherein the beam-shaping elements each comprise an intensity-modulating element and a refractive element.

Embodiments of the present invention are based on the knowledge that a more compact realization of a more complex radiation profile can be obtained by the fact that a beam shaper comprises a multitude of optical beam-shaping elements, each belonging to a type of a plurality of different types, wherein the individual types have different optical characteristics. When appropriately illuminated together, the different optical characteristics effect, in cooperation, the radiation profile to be obtained.

Here, in embodiments of the present invention, the different types of beam-shaping elements can differ with respect to a multitude of different features. Part of these are, for example, a shape or size of the beam-shaping element, a height or a spacing of the intensity-modulating element from the refractive element, a shape or size of an intensity-modulating structure, a position of the intensity-modulating structure of the intensity-modulating element with respect to a position of the refractive element, an implementation of an edge area between two adjacent beam-shaping elements and a shape and size of the refractive element.

Here, the individual beam-shaping elements can be arranged irregularly in an at least partly one- or two-dimensional manner across a substrate. In addition to that, the beam-shaping elements can be implemented in a directly abutting manner, for example to allow a usage of the available building space to be as efficient as possible.

Here, the intensity-modulating elements can comprise an absorbing or a reflective layer or an absorbing or reflective layer system, which can optionally be structured. In embodiments including both layers, the absorbing layer can face the refractive element and the reflective layer can face away from the refractive element in order to allow "recycling" of light with a reduction of extraneous light.

In addition to that, in embodiments of the present invention, the refractive element can further comprise a respective spacing layer facing the intensity-modulating element in order to allow a freer adjustment of the spacing between refractive element and intensity-modulating element.

In addition to that, in embodiments of the present invention, a quality of the radiation profile may be improved by separating immediately adjacent beam-shaping elements by a separating structure comprising, for example, a trench or a separating layer, for reducing extraneous light. Such a separating layer can be implemented in a reflective or absorbing manner. Depending on the used separating structure and the used material for such a separating layer, partial "recycling" of extraneous light within the beam-shaping elements is possible via total reflection, reflection or absorption. Also, for example, penetration of extraneous light from sidewalls can be reduced or eliminated by an absorbing separating layer.

Beam shapers according to embodiments of the present invention can, for example, be shaped based on a common substrate such that the beam-shaping elements comprise at least parts of a common substrate of the beam shaper.

For generating the radiation profile, the beam shapers according to embodiments of the present invention can be implemented such that at least part of the multitude of optical beam-shaping elements is implemented such that different beams based on different beam-shaping elements intersect at a common point at a predetermined spacing from the beam shaper. Here, the different optical characteristics of at least part of the plurality of types of beam-shaping elements can correspondingly be described by a continuous functional context into which information with respect to a location of the respective beam-shaping element is entered. The respective information can relate, for example, to a reference point or a reference beam-shaping element.

Beam shapers according to embodiments of the present invention can additionally comprise a light source arranged on a side of the intensity-modulating elements facing away from the refractive elements. Here, an air gap or refraction index-matched contact material (e.g. glue) can be included between the beam shaper and the light source. A respective light source can include one or several organic or also inorganic light emitting diodes.

BRIEF DESCRIPTION OF THE DRAWINGS

Embodiments of the present invention will be detailed subsequently referring to the appended drawings, in which:

FIGS. 8a to 8f illustrate different arrangement options of beam-shaping elements according to embodiments of the present invention;

DETAILED DESCRIPTION OF THE INVENTION

With reference to FIGS. 1 to 19, embodiments of the present invention will be described below in the form of a beam shaper for a light source arrangement for generating a radiation profile. Before the basic mode of operation as well as implementations of beam shapers according to embodiments of the present invention will be discussed in more detail in the following description, different basic implementations of beam shapers will first be described in the context of FIGS. 1 to 3.

Figure 1:
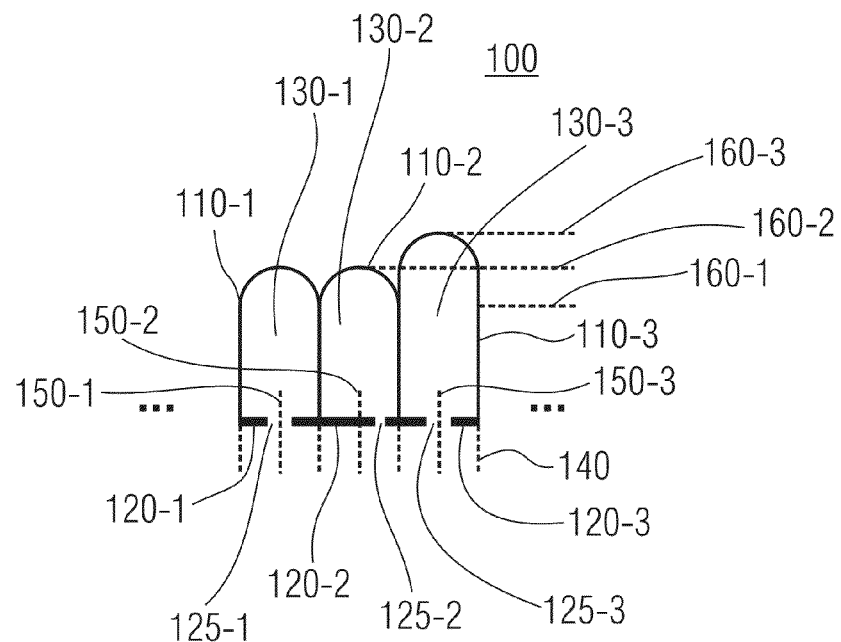
FIG. 1 shows a schematic cross-sectional illustration of a beam shaper according to an embodiment of the present invention.

FIG. 1 shows a beam shaper 100 for a light source arrangement not illustrated in FIG. 1 for generating a radiation profile. Here, the beam shaper 100 comprises a multitude of adjacently arranged optical beam-shaping elements 110, three of which are shown in FIG. 1 in cross-section. The three beam-shaping elements 110-1, 110-2, 110-3 shown in FIG. 1 are of three different types with different optical characteristics. The same are determined by the structural features of the individual beam-shaping elements, as will be discussed below.

Each of the beam-shaping elements 110 comprises an intensity-modulating element 120 and a refractive element 130, which is also referred to as a refracting element.

The intensity-modulating elements 120, of which also three are shown in FIG. 1 with reference numbers 120-1, 120-2, 120-3, are elements comprising an intensity-modulating structure 125 causing a spatial change of the intensity of the beam incident on the intensity-modulating elements 120. These can, for example, be apertures where the respective intensity-modulating structure 125 comprises one or several aperture openings. The same can differ, for example, with respect to size, shape and position. Additionally, intensity-modulating elements 120 can comprise, alternatively or additionally, also gray-scale filters attenuating the intensity of the incident beam in dependence on the spatial coordinate to different extents.

An attenuation coefficient in the sense of a ratio of power radiated behind the intensity-modulating element to a power arriving in front of the intensity-modulating element can then basically assume any values between 0 and typically 1. Basically, in addition to that, there is the possibility, by using interference structures based on interference effects, to obtain intensity modulations in a spectral manner, which realize a respective filter effect.

In other words, the intensity-modulating elements and their intensity-modulating structures can, for example, be apertures that ideally either completely absorb arriving radiation or completely transmit the same. Intensity-modulating elements can further also comprise gray-scale filters, where specific attenuations can occur, or interference structures. For reasons of simplicity, in the following mainly apertures are described as intensity-modulating elements and respective aperture openings as intensity-modulating structures. However, this is in no way meant to be limiting, since the embodiments described below can easily be modified by a respective modification of the intensity-modulating elements.

Starting from a substrate ideally comprising sufficient transparency for the intended radiation, respective intensity-modulating elements can be prepared, for example, by means of lithographic methods, specific vaporization techniques (e.g. shadow vaporization) or other thin-layer techniques. The same applies for respective gray-scale filters, where, for example, a respective intensity curve can be realized by combining a vaporization technique with at least partly isotropic deposition behavior (e.g. sputtering or cathode sputtering) and shadow vaporization.

The refractive elements 130, of which one having reference number 130-1, 130-2 and 130-3 is shown in FIG. 1 for every beam-shaping element 110, can, for example, be implemented as lenses or other elements refracting light or a respective radiation. Apart from spherical lenses or hemispherical lenses (typically planar-convex lenses) mounted, for example, on a transparent substrate not shown in FIG. 1, aspheric, elliptical, cylindrical or other lenses or free-form elements can also be implemented correspondingly. If the beam shaper is based on a common substrate transparent in the respective spectral range of the radiation, respective lenses or free-form elements can be produced, for example based on polymers.

While direct production of the refractive elements or parts of the same is basically possible by means of lithographic methods, frequently a two-stage production method is used. Within a first step, the so-called mastering, so-called master structures are prepared, based on which the actual structures of the beam shapers will be produced by means of replication techniques.

Depending on the implementation of the mastering, the master structures can be prepared directly as negative of the later structure, or also be generated by means of a model (positive) generated first.

By means of the so-called reflow method, where pre-structured polymer structures are exposed to a solution atmosphere or a temperature in the range of the glass temperature of the polymer, a positive of the later structure of the refractive elements can be generated. The same can then be converted to the master structure by means of galvanic methods using aluminum or other metals.

While methods based on the reflow method are better suited for preparing spherical or slightly aspheric lenses having different base areas, any shapes, i.e. also optical free-form elements, can be produced by means of ultra-precision processing. Optical free-form elements frequently generally have no or only a very limited symmetry in the sense of minor or rotation symmetry and are hence different from lenses frequently having clearly visible symmetry characteristics.

Within replication, based on the master structures, the actual structures of the beam shaper can be prepared by means of UV shaping techniques, hot stamping, injection molding, directly stamping into glass or a polymer or another replication technique.

The beam-shaping elements 110, also referred to as channels, have different optical characteristics, which is why they are classified as belonging to different types. For illustrating this in more detail, edge markings 140 and center markings 150 are inserted for the three intensity-modulating elements 120-1, 120-2, 120-3, each as dotted lines. In order not to affect the clarity of FIG. 1, merely one of the edge markings 140 is marked with a respective reference number in FIG. 1.

The types of the two beam-shaping elements 110-1 and 110-2 differ in the embodiment shown in FIG. 1 with respect to position and size of the intensity-modulating structures of the intensity-modulating elements 120, i.e. for example the aperture openings. For example, in the beam-shaping element 110-1, the center marking 150-1 runs centrally through the intensity-modulating structure 125-1. In contrast to this, the center mark 150-2 does not run through the intensity modulation structure 125-2 of the intensity modulation element 120-2. Thus, in the case shown in FIG. 1, the types of the two beam-shaping elements 110-1, 110-2 differ by different positions of the intensity-modulating structures 125 with respect to a position of the refractive element 130. However, regarding the refractive elements 130-1, 130-2, the two beam-shaping elements 110-1, 110-2 do not differ.

While the intensity-modulating element 120-3 of the third beam-shaping element 110-3 does correspond to the first beam-shaping element 110-1, the refractive element 130-3 differs from those of the two first beam-shaping elements 110-1, 110-2. To illustrate this in more detail, FIG. 1 further shows three contour lines 160-1, 160-2, 160-3. Here, the contour line 160-1 illustrates the beginning of a rounding of the refractive element 130-3, which is the same for all three refractive elements of the three beam-shaping elements 110 shown in FIG. 3. In the case of a realization based on a common substrate, the contour line 160-1 can indicate, for example, a position of a main surface of the substrate.

The contour line 160-2 illustrates a level of a highest point of the refractive elements 130-1, 130-2 of the two beam-shaping elements 110-1, 110-2. Correspondingly, the contour line 160-3 above the contour line 160-2 indicates a respective point of the refractive element 130-3 of the third beam-shaping element 110-3.

In other words, the type of the beam-shaping element 110-3 differs from the one of the beam-shaping element 110-1 with respect to a shape or implementation of the refractive element 130. When comparing the types of the beam-shaping elements 110-2 and 110-3, these differ not only with respect to the implementation of the refractive element 130, but also with respect to the implementation of the intensity-modulating element 120, as has already been stated above.

Thus, the comparison of the two beam-shaping elements 110-2, 110-3 shows that the types with different optical characteristics can differ with respect to several features. As has already been indicated above, these are the shape and size of the beam-shaping element 110, a spacing of the intensity-modulating element 120 from the refractive element 130, a shape or size of the intensity-modulating structure 125 of the respective intensity-modulating element 120, a position of the intensity-modulating structure 125 with respect to a position of the refractive element 130, an implementation of an edge area between two adjacent beam-shaping elements 110 and a shape and size of the refractive element.

Before further embodiments of the present invention are described in the context of FIGS. 2 to 19 and discussed regarding their mode of operation, it should be noted here that in the following the same or similar reference numbers are used for elements, objects and structures having similar or the same structure or similar or the same functional characteristics. Correspondingly, in different embodiments of the present invention, elements, structures and objects indicated with the same or similar reference numbers can be implemented identically or differently with respect to their exact implementation details. This relates both to the selection of material, dimensionings and also other parameters.

In other words, in different embodiments of the present invention, objects having the same or similar reference numbers can be implemented in an identical or a similar manner, or in a different manner with respect to at least part of the respective parameters. This allows abbreviating the description and avoiding unnecessary repetitions.

In addition to that, within the present description, summarizing reference numbers are used for objects, elements and structures occurring several times within an embodiment or several times in different embodiments. The summarizing reference numbers indicate, as long as nothing else results from the context or an explicit statement, the respective structure, the respective object or the respective element itself, while the respective object-related reference number is used when describing or discussing a feature of a specific element, object or specific structure.

Figure 2:
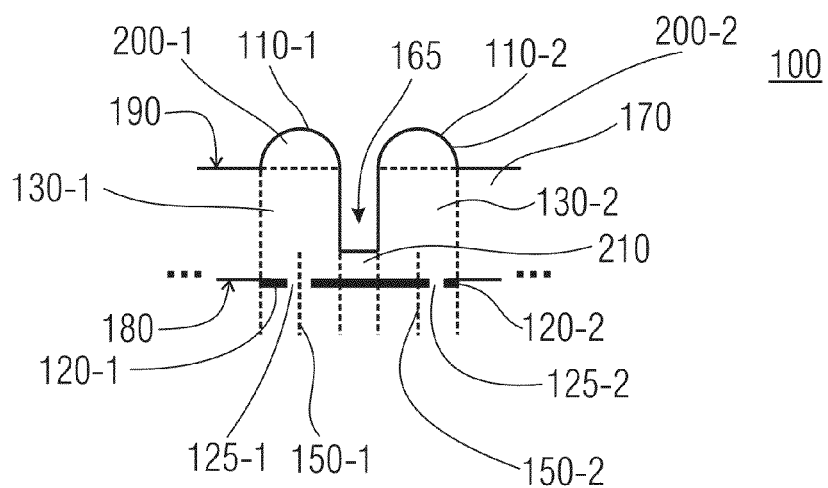
FIG. 2 shows a schematic cross-sectional illustration of a further beam shaper according to an embodiment of the present invention.

FIG. 2 shows a beam shaper 100 according to a further embodiment of the present invention differing essentially from the embodiment shown in FIG. 1 in that the third beam shaping element 110-3 is not shown and that a separating structure 165 is integrated between the first and second beam-shaping elements 110-1, 110-2. More accurately, the separating structure 165 is a trench introduced between the two beam-shaping elements 110.

The beam shaper 100 shown in FIG. 2 is based on a substrate 170, which can, for example, be a glass substrate or another substrate transparent for the respective radiation. Apart from glass substrates, in the case of optical radiation, i.e. for wavelengths in the optically visible range, electrically isolating monocrystalline or polycrystalline substrates, foils or polymer layers can be used, which frequently have a respective transparency in this spectral range.

While the intensity-modulating elements 120 are mounted on a rear side 180 of the substrate 170, for example by means of thin-layer techniques, and are structured, a lens 200-1, 200-2 has been mounted on a front side 190 of the substrate for every channel or every beam-shaping element 110. These can be produced, for example, using the above-described mastering and replication techniques. With the respective areas of the transparent substrate 170, the lenses 200 form the refractive elements 130.

The separating structure 165 can now, or already prior to lens generation, be introduced between the two beam-shaping elements 110-1, 110-2 by a respective etching method. As is shown in FIG. 2, the separating structure 165 extends starting from the front side 190 but not to the rear side 180. Rather, a substrate area 210 remains between the two beam-shaping elements 110, which can contribute to mechanically stabilizing the beam shaper. Especially in this regard, it should be noted that this is no compulsory feature. Thus, with respective process control and respective two-dimensional arrangement of the beam-shaping elements 110, trenches can also be driven significantly further through the substrate 170 than shown in FIG. 2. Basically, it is also possible to let such a trench pass completely through the substrate 170 when other stabilizing measures are taken.

Additionally, there is the option of additionally filling a respective trench 165 by means of a separating material or a more complex separating structure. It is, for example, possible to introduce one or several layers into the trench shown in FIG. 2, which have a reflective or absorbing effect on the respective radiation. This enables, for example, to optically isolate the individual beam-shaping elements 110 from one another in order to increase the light yield of the individual beam-shaping elements 110 or to reduce or even eliminate the irradiation of extraneous light.

Figure 3:
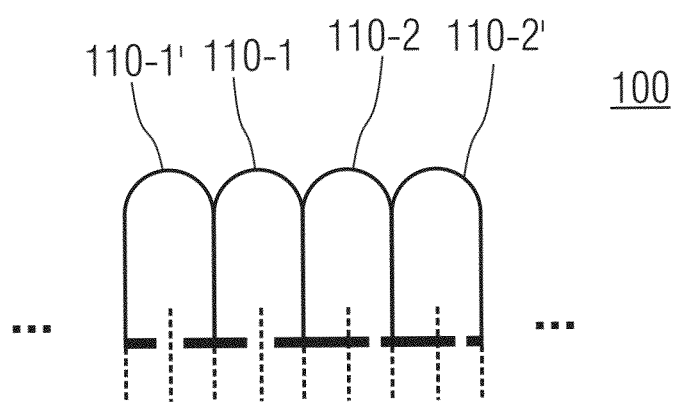
FIG. 3 shows a cross-sectional illustration of a further beam shaper according to an embodiment of the present invention.

FIG. 3 shows a further beam shaper 100 according to an embodiment of the present invention which differs from the embodiment shown in FIG. 1 essentially in that a further beam-shaping element 110-1' of the same type is arranged on the left next to the first beam-shaping element 110-1 and that, instead of the third beam-shaping element 110-3, a beam-shaping element 110-2' is inserted which is of the same type as the second beam-shaping element 110-2. In other words, FIG. 3 illustrates the option that the individual beam-shaping elements 110 of the multitude of beam-shaping elements do not necessarily have to be of different types. However, merely a plurality of types exists, to which a beam-shaping element 110 respectively belongs.

In other words, every beam-shaping element 110 typically belongs to exactly one type of beam-shaping element having respective different optical characteristics, but the number of types is in many cases lower than the number of beam-shaping elements 110 of a beam shaper 100.

Thus, beam shapers 100 according to embodiments of the present invention allow a compact and efficient generation of a complex radiation characteristic or a complex radiation profile of a luminous area having basically any extension and shape. Due to the multitude of possible implementations of types of beam-shaping elements 110, beam shapers can be realized for efficient generation of almost any area-like radiation profile.

As light sources, on the one hand, area light sources, i.e. for example organic light emitting diodes (OLED) can be used where the transversal extension of the finally luminous area approximately corresponds to the size of the actual area light source. On the other hand, individual sources or assemblies of sources having a smaller extension, for example semiconductive or inorganic light emitting diodes can be used as the finally luminous area. Apart from the stated light sources, also such sources can be used that are housed in reflective housings and hence offer similar radiation conditions.

Before further embodiments of the present invention are described in more detail, the term random or complex radiation characteristic or radiation profile will be discussed in more detail. The radiation profile or the radiation characteristic is determined by a location- and angle-dependent power density per area element dA of the luminous area and per solid angle element dΩ according to $$\frac{dP}{dAd\Omega} = B(X, Y, \Theta, \Phi). \tag{1}$$

Here, P is the radiated light power of the light source, (X,Y) are transversal location coordinate on the luminous area and (Θ, Φ) the beam angles of the far-field beams explained below. A random or complex radiation characteristic can be designated by a respective function B(X,Y, Θ, Φ). This means that a different light beam angular distribution that is adjustable by the beam shaper 100 is associated with every point of the luminous area. This will be illustrated below in more detail in the context of FIGS. 4 and 5.

Figure 4:
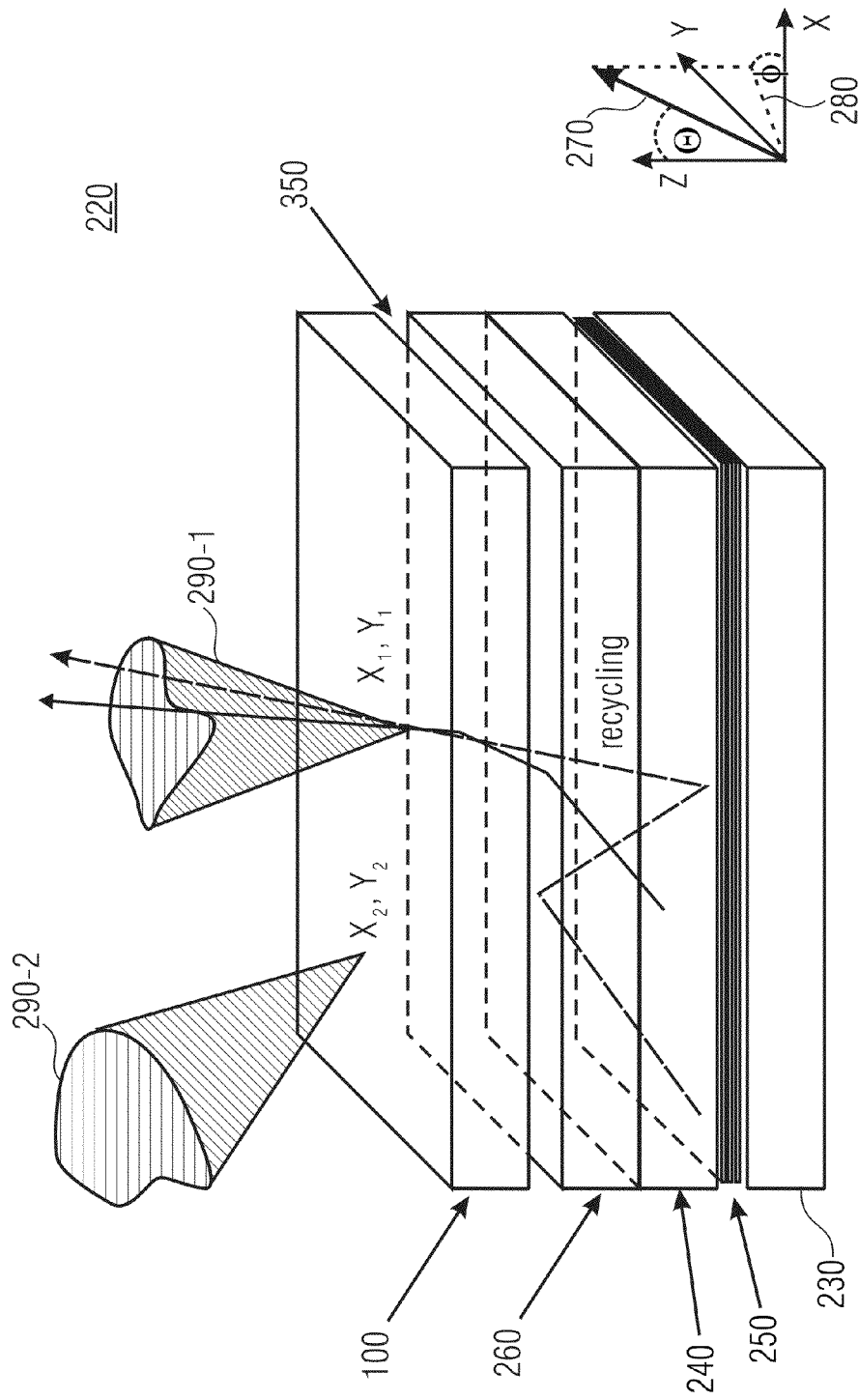
FIG. 4 shows, based on a beam unit having a beam shaper according to an embodiment of the present invention, a schematic diagram for generating a complex radiation characteristic based on an area light source with an optional coupling-out structure.

Based on an embodiment of the present invention, FIG. 4 shows a schematic diagram for generating a complex radiation characteristic of an organic LED as an example of a simple light source by means of an optional coupling-out structure and secondary optics in the form of a beam shaper 100 according to an embodiment of the present invention discussed in more detail below. FIG. 4 shows a beam unit 220 comprising a covering structure 230 that can, for example, also serve to mechanically stabilize or protect the beam unit 220. Such a covering structure can, for example, be implemented as a substrate or also as part of a housing.

Further, the beam unit 220 comprises a substrate 240, which is the substrate of the actual organic light emitting diode, and is hence also referred to as an OLED substrate. A layer stack 250 is mounted on the substrate 240 on a side facing the covering structure 230, which represents the actual organic light emitting diode, i.e. the functional layer structure for generating light. Correspondingly, this layer stack 250 is also referred to as an OLED layer stack. In such a case, the covering structure 230 also serves as an encapsulation structure for protecting the layer stack 250.

In other embodiments of the present invention, the OLED stack 250 can also be mounted on the "lower" of the two substrates 230, 240. In such a case, the two substrates 230, 240 would be interexchanged with respect to their arrangement or function, respectively, wherein the OLED layer stack 250 would still be arranged between the two substrates (possibly "rotation" of the substrate 240 in FIG. 4).

On the side of the substrate 240 facing away from the layer stack 250, an optional coupling-out structure 260 is mounted as primary optics. On the coupling-out structure 260, on the side facing away from the substrate 240, a beam shaper 100 according to an embodiment of the present invention is included, which realizes the radiation profile (radiation characteristic) discussed in more detail below. The radiation direction is given by the two angles $\Theta$ and $\Phi$ describing the angles with respect to a Cartesian coordinate system, as is illustrated in FIG. 4 at the bottom right.

An X-axis and a Y-axis of the coordinate system shown at the bottom right in FIG. 4 describe a plane parallel to the OLED layer structure 250. Based on the essential parallelism of the covering structure 230, the substrate 240, the coupling-out structure 260 and the beam shaper 100, these two coordinate axes also indicate a plane where the beams forming the radiation profile leave the beam shaper 100. Thus, information regarding a location relating to the beam shaper 100 can also be represented by respective X coordinates and Y coordinates.

In addition to that, the coordinate system shown at the bottom right in FIG. 4 also shows a Z-axis running perpendicular to the X-axis and the Y-axis and hence also running perpendicular to the above-stated layers and structures of the beam unit 220. Any direction 270 can thus be described on the one hand by the angle $\Theta$, which the same encloses with the Z-axis, and by an angle $\Phi$, which a projection 280 of the direction 270 into the plane defined by the X-axis and the Y-axis encloses with the X-axis.

Thus, the radiation characteristic according to equation (1) means that every point of the luminous area of the beam unit 220 comprises a possibly different light beam angular distribution set by the beam shaper 100. FIG. 4 shows this situation by two different light radiation cones 290-1, 290-2 at the two locations $(X_1, Y_1)$ and $(X_2, Y_2)$. Hence, both random near fields directly at the luminous area and random far-field distributions are generated.

For generating luminous areas, as has already been indicated above, area light sources such as organic light emitting diodes (OLED) can be used. This is shown in FIG. 4, where the organic light emitting diode is formed not least by the OLED substrate 240 and the OLED layer stack 250. The resulting radiation characteristic in the far field is determined by the internal structure of the area light source. The radiated power density of the source $$\frac{dP_{source}}{dAd\Omega} = B_{source}(X, Y, \Theta, \Phi) \quad (2)$$

is determined by the internal structure. The radiation is normally effected into the whole half space with $\Theta$ between 0° and 90° and $\Phi$ between 0° and 360°.

Apart from different contacting phenomena or voltage drops across the OLED area of the layer stack 250, the power density of an organic light emitting diode in good approximation can be considered as independent from the transversal coordinates (X, Y) and the azimuth angle $\Phi$. Hence, the power density of the source results as a simplified form of equation (2) to $$\frac{dP_{source}}{dAd\Omega} = B_{source}(\Theta). \quad (3)$$

Radiation is here effected generally for all polar angles between $\Theta$ between 0° and 90°.

Thus, for generating any radiation characteristics or radiation profiles, optical beam shapers 100 with potential additional coupling-out optics are advisable. In order to keep the whole light unit or beam unit 220 as compact as possible, in order not to cancel out the advantage of low thickness of some area light sources, such as organic light emitting diodes, by bulky optics, it would be desirable for the beam-shaping optics, i.e. the beam shaper 100 and the possibly included coupling-out optics 260, to have approximately the same dimension as the area light source itself, as small a thickness as possible of not more than 5 mm, 2 mm or 1 mm and to be mounted directly on or in front of the area light source.

It follows from this dimensioning of the optics that, due to the physical principle of conservation of the etendue, such beam shaping can only be obtained with relatively large losses of radiated overall power. Thus, beam shapers 100 according to embodiments of the present invention—when they are appropriately dimensioned—and, if needed, by incorporating the optional coupling-out structure 260, can still realize an intensity increase within the target distribution with a proportion of extraneous or parasitic light that is as low as possible.

For generating luminous areas having specific radiation characteristics, sources or source assemblies having smaller dimensions than the luminous area can be used. Examples of this are inorganic light emitting diodes, i.e. for example semiconductor light emitting diodes. Here, the same frequently have specific radiation characteristics, for example a quasi-lambertian behavior of inorganic light emitting diodes without optics. To realize a luminous area having predetermined random radiation characteristics, usage of optical arrangements is frequently advisable to distribute light of the source (s) to the size of the luminous area, to generate light homogenization and to allow beam shaping, i.e. adjusting a power density according to equation (1). A simple and compact arrangement having low optics thickness, as is frequently desirable, is shown, for example, in FIG. 5.

Figure 5:
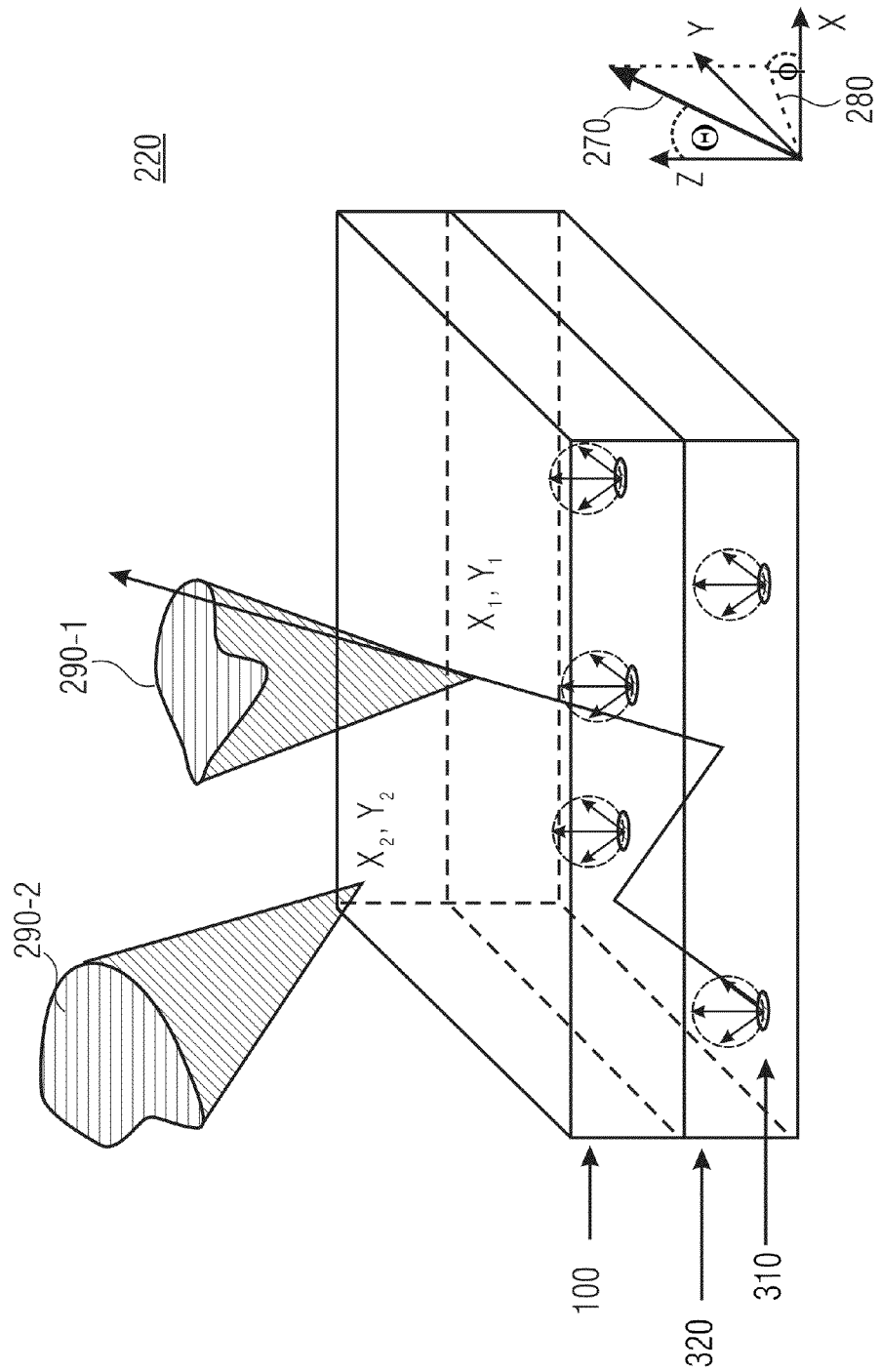
FIG. 5 shows, based on a further beam unit having a beam shaper according to an embodiment of the present invention, a schematic diagram for generating a more complex radiation characteristic (optionally in a reflective housing)

FIG. 5 shows a further beam unit 220 which, contrary to the beam unit 220 shown in FIG. 4, is based on a light source unit 300 comprising a plurality or an assembly of individual light sources 310. These light sources 310 can, for example, be individual inorganic light emitting diodes (e.g. semiconductor light emitting diodes) implemented at or on a common substrate. Also, the individual or the further individual light sources can be housed in a common housing, as will be explained further on. For simplicity's sake, FIG. 5 shows a simplified form of the light source unit 300, where merely two individual light sources 310 are highlighted as such in the front area.

A beam shaper 100 according to an embodiment of the present invention is arranged in the beam direction of the light sources 310 on the light source unit 300. The beam shaper 100 also comprises a respective exit area, from which the beams exit with the radiation characteristic determined by the beam shaper 100. Analogously to the illustration in FIG. 4, FIG. 5 again shows two light radiation cones 290 for two different locations on the respective surface of the beam shaper 100, which are characterized by their coordinates on the X-axis and the Y-axis. The coordinate system shown at the bottom right in FIG. 5 again corresponds to that shown in FIG. 4.

In other words, FIG. 5 shows a schematic diagram for generating a random radiation characteristic based on an assembly of light sources 310. Depending on the specific implementation, the individual light sources 310 can optionally be introduced in a reflective housing 320. Alternatively to a reflective housing, other, for example absorbing, housings, can, of course, be used, which, however, might then not allow "recycling" of the emitted light seeking to leave the light source unit 300 at the side areas.

Independent of the fact of whether a further coupling-out structure 260 is actually implemented, the beam shaper 100 is frequently also referred to as secondary optics. This description is historically based rather than technically necessitated, since, depending on the specific implementation of a beam shaper according to an embodiment of the present invention, an implementation of a coupling-out structure 260 or further beam-shaping optics might be omitted, as will be shown further on.

In the following, further embodiments of beam shapers 100 according to embodiments of the present invention will be described. Here, a "modular description" will be used, where different details of beam shapers 100 are described not least with respect to FIGS. 6 to 8. The same can be combined arbitrarily within different embodiments of the present invention, as long as the respective general requirements of process control during production and geometric considerations are considered.

A beam shaper 100 according to an embodiment of the present invention is typically based on a large assembly of one-dimensionally or two-dimensionally arranged radiation shaping elements 110, which are also referred to as single channels. Each of these single channels 110 typically comprises a custom-made refractive element 130 arranged on the image side and a respective intensity-modulating element 120. In different embodiments, the same can comprise a reflective or absorbing aperture, for example, or also both a reflective aperture arranged on the source side and an absorbing aperture arranged in the direction of the refractive element. The same can, for example, be arranged or mounted on a bottom side of the respective beam shaper 100, i.e. on the source side, wherein the individual apertures frequently have a very small thickness in the range below 100 µm, below 10 µm, or even below 1 µm.

This basic structure that has already been explained in the context of FIGS. 1 to 3 is now subject to very large degrees of freedom with respect to the exact implementation of the beam-shaping elements. FIG. 6 shows, in detailed images a to l, different possible basic structures of single channels 110 of the beam shaper 100.

Figure 6A:
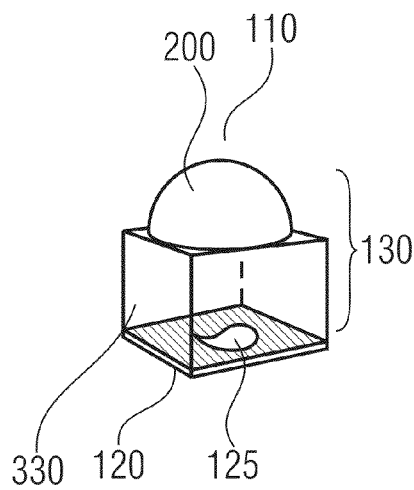
FIGS. 6a to 6l show different embodiments of beam-shaping elements for beam shapers according to embodiments of the present invention.

FIG. 6a shows a first beam-shaping element 110 with a refractive element 130 comprising a spacing layer 330, which is also referred to as a "spacer" and can be part of a common substrate of different beam-shaping elements 110. A lens 200 in the form of a (semi-) spherical lens, which is also part of the refractive element 130, is mounted on the spacing layer 330.

In addition to that, the beam-shaping element 110 comprises an intensity-modulating element 120 implemented as an aperture having a respective aperture opening as an intensity-modulating structure 125. Here, the aperture 120 is implemented as an absorbing aperture.

Figure 6B:
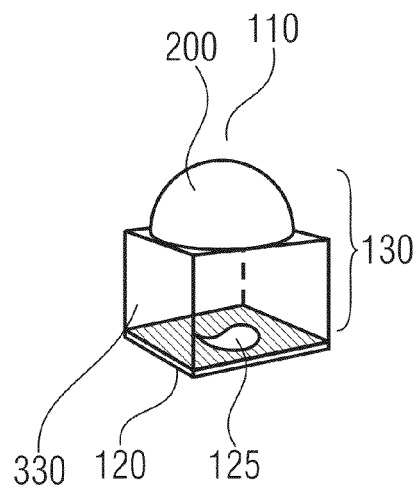

The beam-shaping element 110 shown in FIG. 6b differs from that shown in FIG. 6a merely with respect to the design of the aperture 120. The latter is implemented as a reflective aperture in the beam-shaping element 110 shown in FIG. 6b.

Figure 6C:
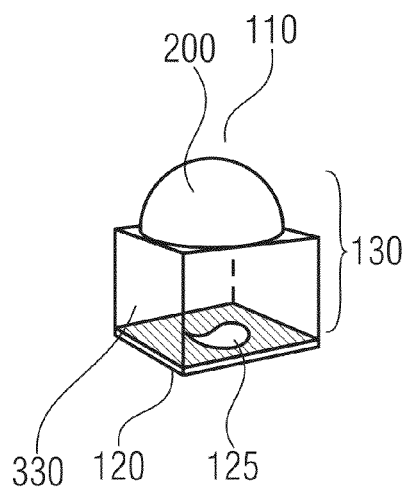

FIG. 6c shows a further embodiment of a beam-shaping element 110, wherein, instead of an absorptive aperture as shown in FIG. 6a, both a reflective and an absorbing aperture are implemented, which together form the intensity-modulating element 120. Here, the reflective part of the aperture is mounted on the bottom side, while the absorbing part faces the refractive element 130.

Otherwise, the beam-shaping elements 110 shown in FIGS. 6a to 6c do not differ from each other. They have in common, for example, that they comprise a rectangular or square channel geometry and that the respective refractive element 130 comprises a lens having a dead zone, which is also mounted on a spacing, layer 330 (spacer). The individual beam-shaping elements 110 differ merely with respect to the apertures serving as intensity-modulating elements 120. These three variations represent, on the one hand, a purely absorptive aperture (FIG. 6a), a purely reflective aperture (FIG. 6b) or a combined absorptive/reflective aperture (FIG. 6c), wherein there is basically also the option of reversing the layer sequence with respect to the version shown in FIG. 6c or to implement other intensity-modulating layers.

Figure 6D:
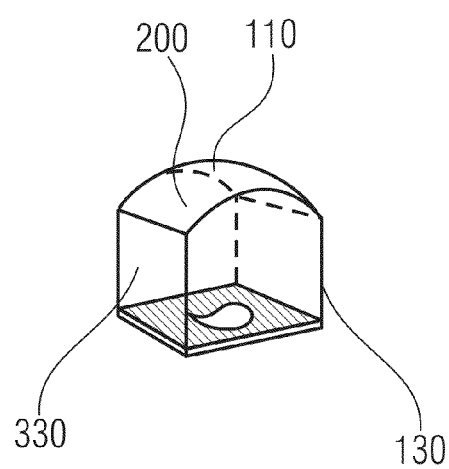

FIG. 6d shows a further beam-shaping element 110 having a rectangular or square channel geometry, as has already been shown in FIGS. 6a to 6c. Here, the reflective element 130 has a lens 200 that has no dead zone, contrary to that shown in FIGS. 6a to 6c.

Here, the dead zone of the lens means part of an area or an area not covered by the lens 200 with respect to its base area, but to be allocated to the beam-shaping element 110 as base area. If the refractive element 130 comprises a spacing layer 330 or a similar layer, a dead zone, or dead zone of the lens, results in the illustration shown in FIG. 6 when the lens 200 mounted on the spacing layer 330 does not fully cover the portion of the spacing layer 330 of the beam-shaping element 110.

In contrast to the beam-shaping elements 110 shown in FIGS. 6a to 6c, the lens 200 covers the spacing layer 330 (spacer) completely with respect to the part, which is to be allocated to the beam-shaping element 110. Thus, the embodiment shown in FIG. 6d is an embodiment having a refractive element 130 with a lens 200 without a dead zone of the lens.

Merely for completeness' sake, it should be noted here that, also with respect to the embodiment shown in FIG. 6d, the variations of the intensity-modulating element 120 explained in the context of FIGS. 6a to 6c can, of course, be implemented.

Figure 6E:
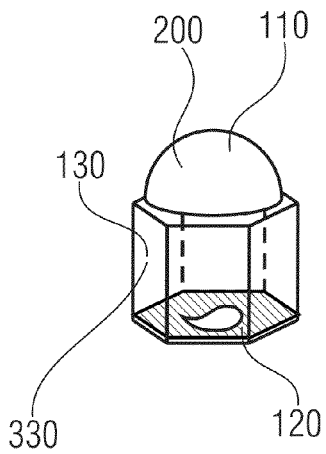

FIG. 6e shows a further beam-shaping element 110 differing from the embodiment shown in FIG. 6b merely with respect to the base area of the beam-shaping element. Thus, the embodiment shown in FIG. 6b comprises a square or rectangular channel geometry, while the beam-shaping element 110 in FIG. 6e comprises a respective hexagonal channel geometry. Here, as also in the embodiment shown in FIG. 6b, the lens 200 is implemented as a spherical or semi-spherical lens having a dead zone. This means that in the embodiment shown, the spacing layer 330 has to be allocated to the beam-shaping element 110 with respect to a hexagonal area.

Figure 6F:
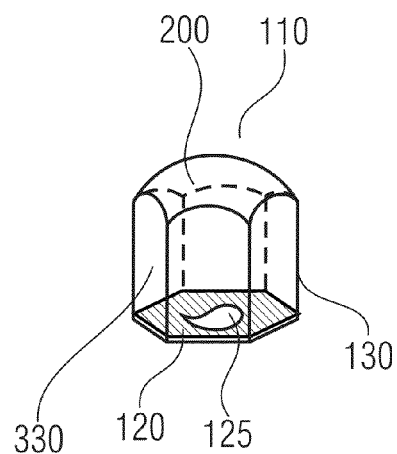

FIG. 6f shows an embodiment of a beam-shaping element 110 differing from the beam-shaping element 6e merely in that the lens 200 is implemented without a dead zone of the lens. In other words, in the embodiment shown in FIG. 6f, no portion of the base area not covered by the lens 200 to be allocated to the beam-shaping element 110 exists.

The question of the allocatability of the base area, for example of the spacing layer 330, to the individual beam-shaping elements 110, will be discussed in more detail in the context of FIG. 8. The same is frequently given by the arrangement of the individual intensity-modulating structures 125, i.e. in the case of apertures by the arrangement of the aperture openings. Above that, a respective segmentation of the available base area of a beam shaper 100 according to an embodiment of the present invention can, of course, also be effected by introducing respective separating structures, as was already shown in FIG. 2. In such a case, for example, the respective base areas of the beam-shaping elements 110 can also be realized physically in the beam shaper by trenches or other separating structures.

Figure 6G:
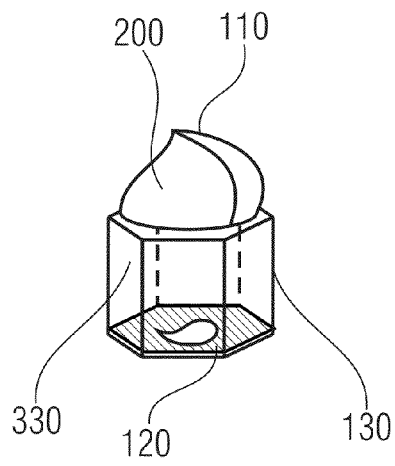

FIG. 6g shows a further embodiment of a beam-shaping element 110 differing from the beam-shaping element 110 shown in FIG. 6g in that now, instead of the spherical lens 200 with a dead zone, an optical free-form element 200 having a dead zone on a spacing layer 330 is implemented as refractive element 130 on a hexagonal geometry. Here, consequently, an area exists which is to be allocated to the base area of the beam-shaping element 110 is and which is not covered by the optical free-form element 200.

Figure 6H:
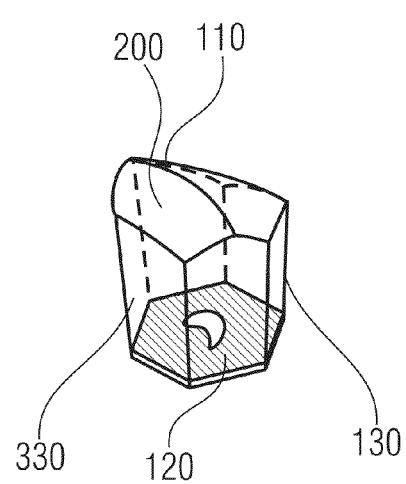

Contrary to this, FIG. 6h shows a further beam-shaping element 110 having a hexagonal channel geometry and a lens 200 in free-form technique, which, however, contrary to the lens shown in FIG. 6g, does not comprise a dead zone. In other words, the optical free-form element 200 of FIG. 6h completely covers the base area allocatable to the beam-shaping element 110.

Figure 6I:
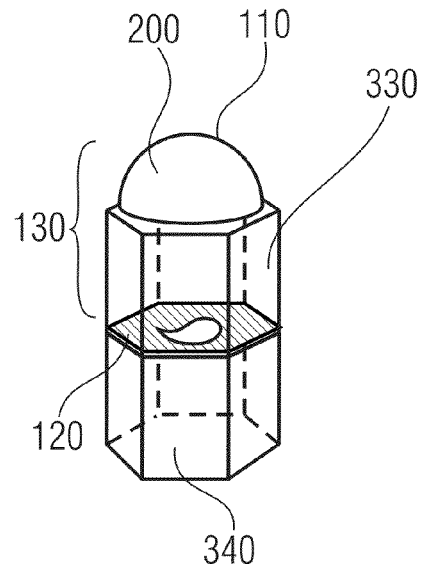

FIG. 6i shows a further embodiment of a beam-shaping element 110 that is very similar to that shown in FIG. 6e. In more detail, the beam-shaping element 110 shown in FIG. 6i differs from that shown in FIG. 6e merely in that the beam-shaping element 110 comprises a further layer 340 abutting on the intensity-modulating element 120 on the side facing away from the refractive element 130. This can, for example, be a substrate additionally introduced for the purpose of stability, for adjusting the spacing or for reasons of production engineering, which, in a completed assembly into a beam unit 220, lies between the intensity-modulating element 120 and the actual light sources. The further layer 340 can, for example, also be part of the coupling-out structure 260. Depending on the specific implementation, it can be advisable to design the further layer 340 to also be transparent in the respective spectral range of radiation. However, this is no compulsory prerequisite, since channels corresponding to the aperture opening can also be introduced into the further layer 340, for example.

Figure 6J:
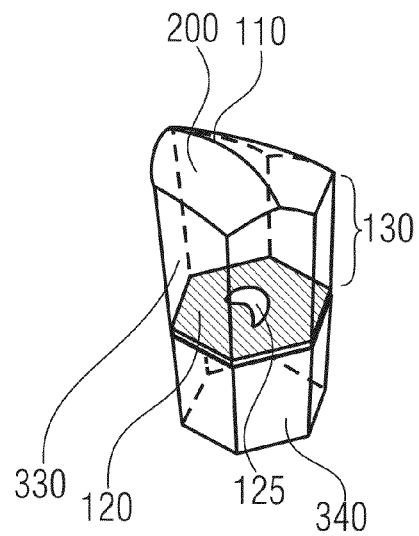

FIG. 6j shows a further embodiment of a beam-shaping element 110 essentially corresponding to that shown in FIG. 6h. The same differs merely in that a further layer 340 has been mounted on the side of the intensity-modulating element 120 facing away from the refractive element 130, as was also the case with the beam-shaping element 110 shown in FIG. 6i. In other words, FIGS. 6i and 6j each show beam-shaping elements 110 having additional substrates or further layers 340 mounted on the bottom side. Here, FIG. 6i is based on a semi-spherical lens within the refractive element 130, while in the beam-shaping element 110 an optical free-form element is implemented within the refractive element 130.

Figure 6K:
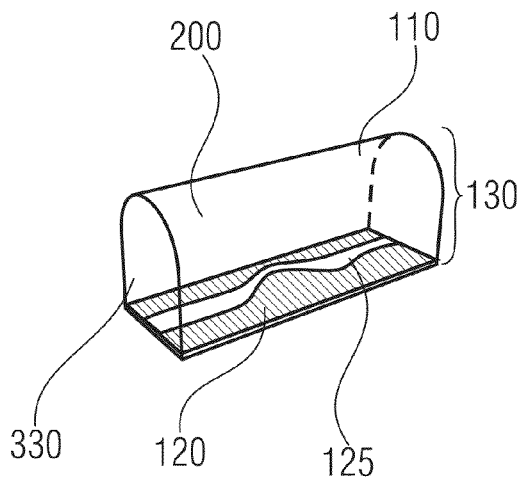

FIG. 6k further shows a further embodiment of a beam-shaping element 110 differing from the above-shown beam-shaping elements, if nothing else, in that the beam-shaping element 110 has a base area extending longitudinally in this case. The refractive element 130 again comprises a spacing layer 330 on which a lens 200 is mounted. The same is a cylindrical lens or a semi-cylindrical lens having a convex refraction area and a planar refraction area in immediate contact with the spacing layer 330. The intensity-modulating element 120 is implemented correspondingly as a longitudinally extending aperture having a more complex aperture opening as the intensity-modulating structure 125. The beam-shaping element 110 can have a length along a preferential direction comprising a multiple of a respective width perpendicular to the propagation direction. Frequently, such a respective length is more than 5 times, more than 10 times, more than 20 times or more than 50 times longer compared to a respective width. For this reason, a respective beam-shaping element 110 is also referred to as a one-dimensional lens or cylindrical lens having a respective aperture geometry extending longitudinally.

Figure 6L:
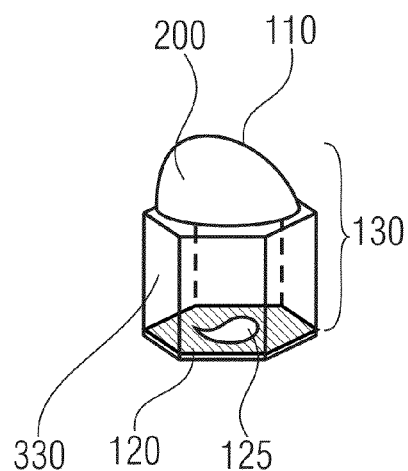

FIG. 6l finally shows, as a further embodiment, a beam-shaping element 110 comprising a polygonal channel geometry. Here, again, within the refractive element 130, an optical free-form element 200 is implemented with a dead zone on a spacing layer 330 (spacer).

As has already been explained above, the different embodiments of the beam-shaping elements 110 illustrated in FIG. 6 merely show a small section of possible implementations. The respective beam-shaping element can significantly differ with respect to their base area and their size in different implementations of beam shapers, but also within an individual beam shaper. Apart from rectangular or square base shapes, hexagonal, polygonal or irregularly shaped base areas are also possible. Also, one-dimensional structures are possible where a preferential direction comprises a multiple (e.g. 5 times or more) of the width of the respective structure. Also with respect to the absolute sizes, the individual beam-shaping elements can differ enormously both from beam shaper to beam shaper and with respect to different types of an individual beam shaper.

Typical sizes for beam-shaping elements 110, i.e. single channels 110, are in a range of approximately 10 μm to 10 mm. In other words, different beam-shaping elements 110 can differ with respect to their size by three orders of magnitude. Depending on the specific application for which a beam shaper 100 of an embodiment of the present invention is intended, as a tendency, smaller beam-shaping elements having characteristic sizes in the range between 10 μm and 100 μm but also larger beam-shaping elements having sizes of more than 100 μm can be implemented.

Regarding the selection of possible materials, a multitude of different implementation alternatives is available. There is, for example, the option to produce the refractive element 130 completely or also only partly, for example with regard to the lens 200, of a transparent organic material. For this purpose, different polymers or other organic substances can be used. Basically, there is also the option to use crystalline and/or inorganic materials.

Regarding the intensity-modulating elements 120, respective reflective apertures or intensity-modulating structures 125 can be produced from a metal (e.g. aluminum), a dielectric mirror system, a diffusely reflective material (e.g. barium sulfate) or also of a combination of the above-named materials. Regarding the absorbing intensity-modulating structures 125, the same can also be produced from an absorptive polymer, a mixture of polymer and other absorptive substances, black chrome or other materials.

In addition to that, as has already been briefly mentioned above, there is the option, depending on the application, to implement the aperture opening or other intensity-modulating structures 125 in the form of a recess (air), or to fill them with an appropriate transparent material. In the case of filling with a transparent material, this can be effected, for example, with the same material that has been used for the refractive element, such that discontinuities with respect to the refraction indices can be avoided or at least reduced.

In addition to that, there is the option to prepare the assembly of beam-shaping elements (single channels) on a transparent substrate, as is shown in FIGS. 6i and 6j.

Regarding the different parameters, geometries and variations, there is basically the option to produce the aperture openings or intensity-modulating structures 125 in any shape or form at basically any position within the beam-shaping element 110. Further, the refractive elements 130 can comprise, for example, spherical or aspherical lenses, as are shown in FIGS. 6a to 6f and 6k, or can also have free-form elements, as is shown in FIGS. 6g, 6h, 6j, 6l. Optionally, the refractive elements 130 can comprise a respective spacer layer 330.

Thus, regarding the refractive element 130, there is the option to implement lenses 200 as spherical or aspherical lenses with or without dead zones. Also, there is the option to implement optical free-form elements with or without dead zones, as well as to provide respective cylindrical lenses in the case of one-dimensional beam-shaping elements 110. Depending on the specific implementation, there is additionally the option to provide the spacing layer 330 or to not implement the same.

Regarding the intensity-modulating element 120, an intensity-modulating structure 125 can be defined based on an absorptive, a reflective or a combination of the above-named materials. A shape, form or size of the intensity-modulating structures 125 can basically be determined freely within the basic requirements allowing the specific implementation. Optionally, in addition, a further layer, for example in the form of a transparent substrate, can be provided on the source side, i.e. different from the intensity-modulating elements 120 on the side facing away from the refractive element 130.

In addition to that, in order to obtain a bulk factor that is as large as possible, there is the option to let the lenses or free-forms 200 cover the whole channel or the whole beam-shaping element or to design the allocated base area so as to be able to obtain dead zones that are as small as possible. The base areas of the lenses 200 can thus, for example, be shaped in a circular, square, hexagonal, polygonal or also irregular manner, as is shown, among others, in FIGS. 6a to 6l.

The optical and structural characteristics of the beam-shaping elements 110 or the single channels 110 can both be the same and can differ with respect to groups of beam-shaping elements 110 of the multitude of beam-shaping elements 110 of the beam shaper 100. Here, it is both possible that every beam-shaping element varies from element to element, i.e. from channel to channel, or that several beam-shaping elements belong to the same type having the same optical characteristics. In the first case, the number of types would correspond to the number of beam-shaping elements of the beam shaper, while in the second case the number of different types would stay behind the number of beam-shaping elements 110.

Figure 7A:
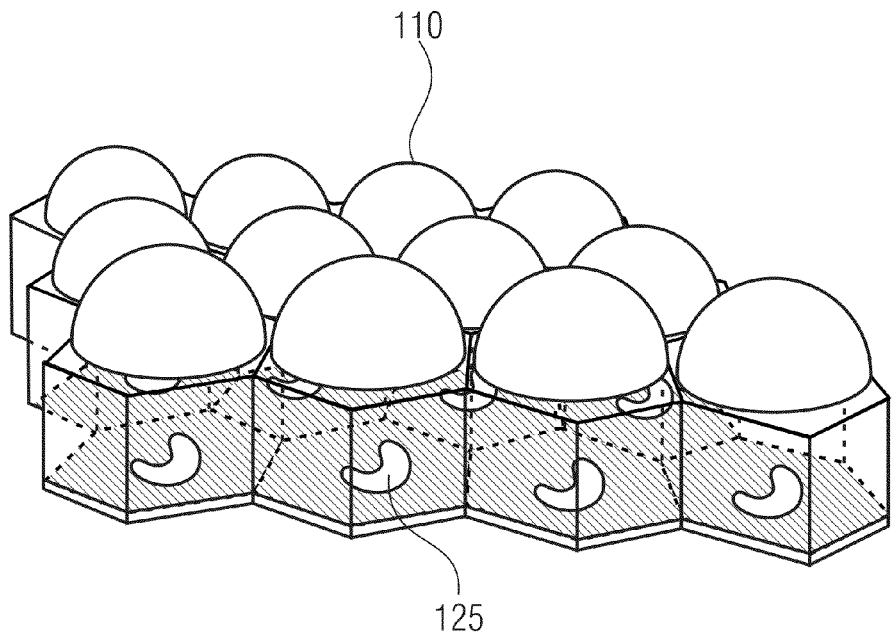
FIGS. 7a and 7b show simplified sections of a beam shaper according to an embodiment of the present invention having hexagonal channel geometries.
Figure 7B:
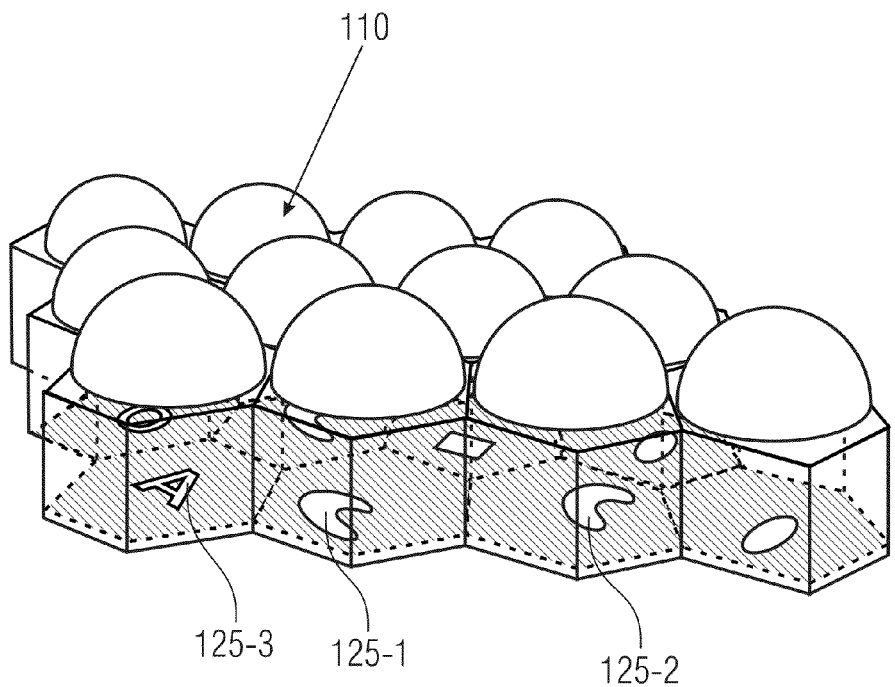

Thus, FIG. 7a shows, based on the beam-shaping element 110, as is shown in FIG. 6e, a section of a group of beam-shaping elements 110 belonging to an identical or equal type having respective optical channels. In contrast, FIG. 7b shows a respective arrangement of beam-shaping elements 110, not differing from the beam-shaping elements 110 shown in FIG. 6e with respect to the refractive elements 130, but comprising different intensity-modulating elements 120 in the form of different apertures. Here, both the position of the individual intensity-modulating structures within the intensity-modulating elements (e.g. different position of the intensity-modulating structures 125-1, 125-2) varies as well as the different shapes (e.g. intensity-modulating structures 125-1 and 125-3). Thus, FIG. 7 shows a section of a beam shaper 100 having a hexagonal channel geometry, wherein in the partial figure a the same channel characteristics and in the partial figure b different channel characteristics predominate.

The optical characteristics of the different types can result, for example, due to the different sizes or shapes of the beam-shaping elements 110, the shape or form of the aperture openings, the position of the aperture openings in the respective channel or also the shape and size of the refractive element.

Regarding the arrangement of the individual beam-shaping elements 110 within a beam shaper 100, a plurality of different options result, which will be described only partly below. If, for example, the same channel cross-sectional areas exist, i.e. the same channel shapes and channel sizes, the single channels or beam-shaping elements 110 can be arranged regularly to each other. In the case of two-dimensional arrangements, for example, square, rectangular or hexagonal arrangements can be selected. In the case of a one-dimensional arrangement, there is the option to place the individual beam-shaping elements 110 within a stripe arrangement. This is illustrated exemplarily in FIGS. 8a to 8d.

FIG. 8a shows a first arrangement option of individual beam-shaping elements 110 for an overall beam shaper 100 having a square symmetry. FIG. 8a shows a square arrangement of 16 beam-shaping elements 110-1 to 110-16, where the first and the last of a respective row are indicated with reference numbers.

FIG. 8b shows a corresponding arrangement very similar to that of FIG. 8a also of 16 beam-shaping elements 110-1 to 110-16, wherein, however, the individual beam-shaping elements 110 have a square base area, so that also the overall arrangement shows a respective square symmetry or base area. In the cases of FIGS. 8a and 8b, an adaptation of the arrangements to an underlying substrate or carrier size is possible.

FIG. 8c shows a possible arrangement of one-dimensional beam-shaping elements 110, as are shown, for example, in FIG. 6k. The arrangement in FIG. 8c comprises five linear or one-dimensional beam-shaping elements 110-1 to 110-5 arranged side by side in a direction perpendicular to their preferential direction. In other words, FIG. 8c shows a stripe-shaped arrangement of beam-shaping elements 110.

FIG. 8d shows a hexagonal arrangement having a respective hexagonal symmetry of hexagonal beam-shaping elements 110, as are also illustrated, for example, in FIGS. 6e to 6j. The arrangement of FIG. 8d comprises, in the present case, eight beam-shaping elements 110-1 to 110-8, but can obviously also be implemented to be larger or smaller.

In the case of different channel cross-sectional areas, which can result in different channel shapes and channel sizes, irregular arrangements might be advantageous, as are shown in FIGS. 8e and 8f. Thus, there is, for example, the option of minimizing spurious Moiré effects by a respective irregular arrangement. Also, with different channel cross-sectional areas of the individual beam-shaping elements 110, it might be possible to obtain a higher area utilization compared to a regular arrangement. Further, there is the option that, if the input intensities can be correspondingly changed in a spatial manner, the optical power can be controlled to different pixels.

FIG. 8e thus shows an arrangement of 13 beam-shaping elements 110-1 to 110-13 having irregular polygonal peripheral lines. In contrast, FIG. 8f shows a possible arrangement of 15 different beam-shaping elements 110-1 to 110-15, whose boundaries are given by irregular, but continuously differentiable curves.

Of course, other geometries and other geometrical arrangements than those shown in FIG. 8 can be used. Thus, the respective arrangements are not only unlimited towards the top or the bottom with regard to their size, but also with regard to the individual arrangements of the individual beam-shaping elements 110. Rather, there is a large extent of freedom in the design and layout of the respective beam shaper 100 according to an embodiment of the present invention as regards to the distribution of the individual beam-shaping elements 110 across the beam shaper to allow a radiation profile that is as optimal as possible and is adapted to the intended use.

Dividing the available space of a substrate or a carrier of a beam shaper 100 according to an embodiment of the present invention into individual beam-shaping elements 110 can be possible, for example, by arranging apertures or aperture openings 125, by arranging lenses 200 or also by implementing separating structures 165. While in the latter case a typically structurally given division exists, a division of the beam-shaping elements 110 merely effected by arranging aperture openings 125 might not be clear. Still, in many cases, clear allocations of channel areas result.

With respect to the production of a complete beam unit 220, as was already shown, for example, in FIGS. 4 and 5, i.e. with respect to the option of combining a light source and a beam shaper into the beam unit, there are different options as to how the overall element is mounted on the area light source or also on a respective reflective housing. The same are discussed in more detail in the context of FIGS. 9a, 4 and 9b.

FIG. 4a has already shown a variation where the beam shaper 100 is directly mounted on an area light source 250 with additional coupling-out optics 260 (e.g. a so-called pyramid array), wherein typically an air gap 350 (shown in FIG. 4) is formed between the coupling-out optics 260 and the beam shaper 100.

Figure 9A:
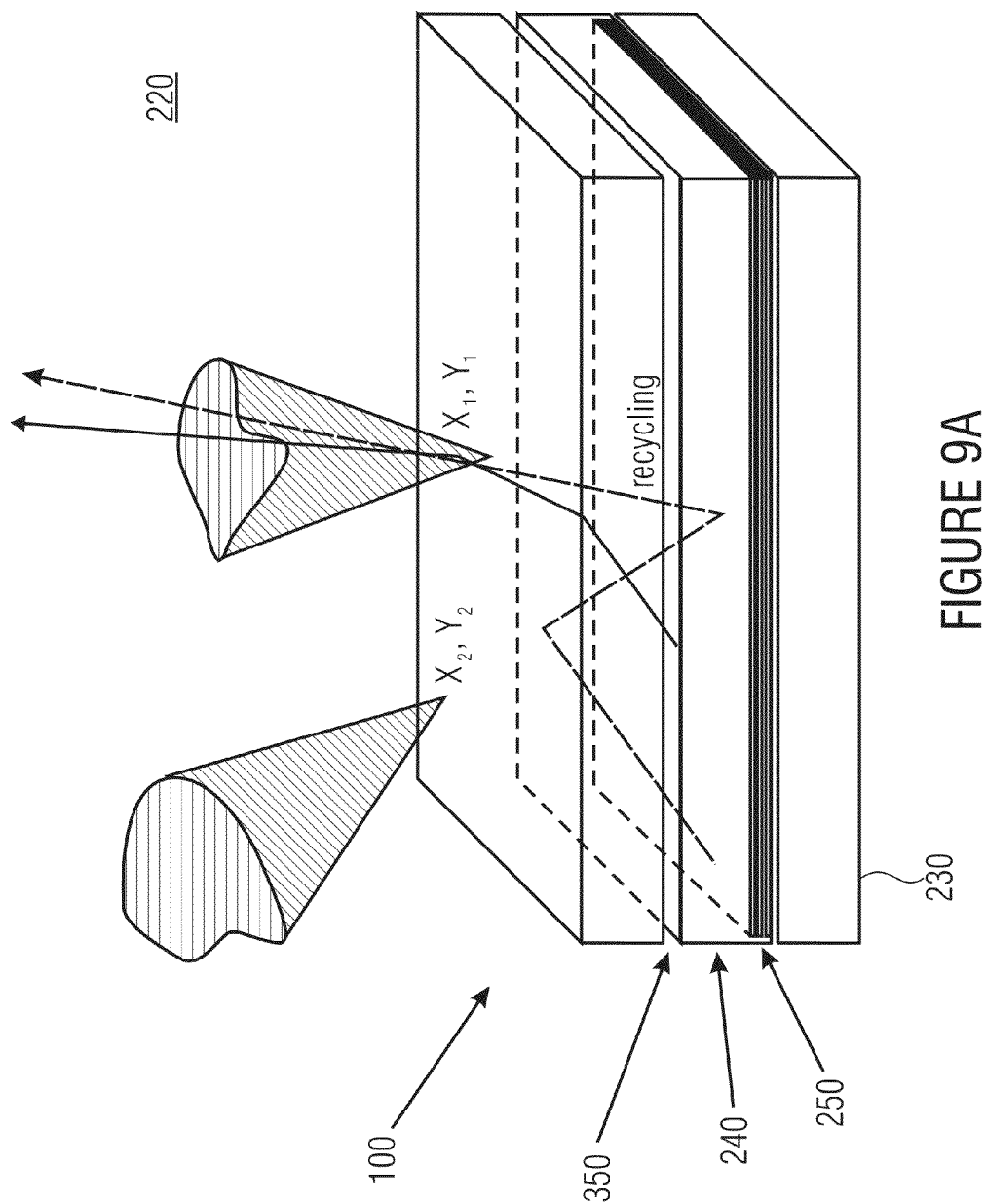
FIG. 9a illustrates schematically the mounting of a beam shaper according to an embodiment of the present invention on an area light source having an air gap between light source and beam shaper.

In contrast to this, FIG. 9a shows an option of mounting a beam shaper on an area light source that is very similar to FIG. 4. FIG. 9a also shows a beam unit 220 differing from the beam shaper 220 of FIG. 4 substantially in that the beam unit 220 shown in FIG. 9a does not comprise a coupling-out structure 260. The beam shaper 100 according to an embodiment of the present invention is, on the contrary, mounted directly on the OLED substrate 240, so that an air gap 350 is formed between the OLED substrate 240 and the beam shaper 100. In other words, the beam shaper 100 is typically mounted directly on the area light source 250 such that an air gap exists between the source or its substrate 240 and the beam shaper 100.

Thus, there is a significant difference between the beam units 220 of FIGS. 9a and 4 in that in the beam unit 220 shown in FIG. 9a the air gap 350 exists between source and beam shaper, while no substrate coupling-out optics in the form of a coupling-out structure 260 exists. The same exists, however, in the beam unit 220 shown in FIG. 4, wherein the air gap 350 is between the beam shaper 100 and the substrate coupling-out optics or the coupling-out structure 260.

Another option of providing a beam unit 220 based on a beam shaper 100 according to an embodiment of the present invention is to mount the beam shaper 100 on an area light source in an index-matched manner on the light source substrate. This can be effected, for example, by means of an index-matched contact material (e.g. glue), wherein, due to the index-matched contact material, no air gap exists between the source and the associated substrate 240 and the beam shaper 100.

Figure 9B:
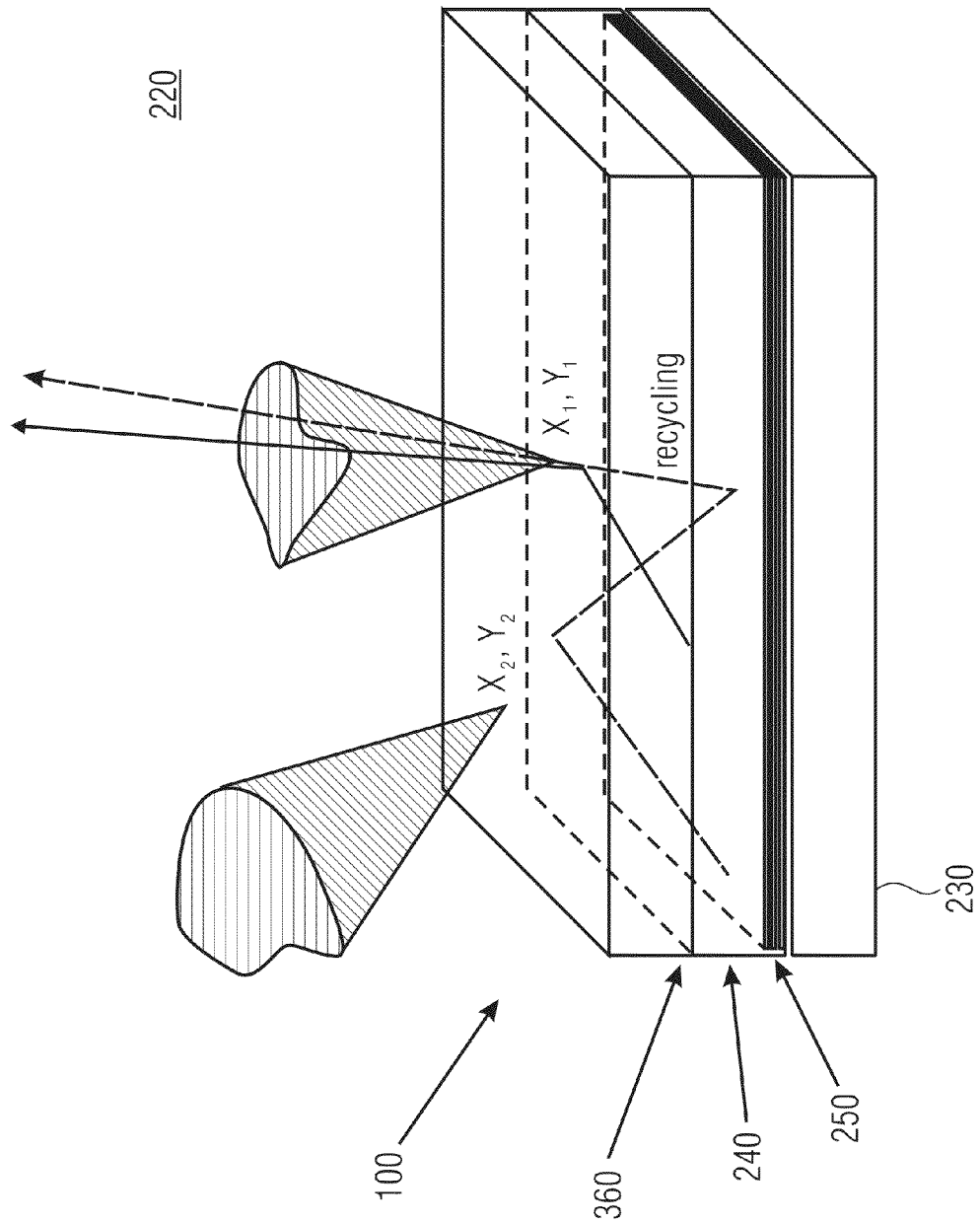
FIG. 9b illustrates schematically the mounting of a beam shaper according to an embodiment of the present invention on an area light source with a refraction index-matched contact material (e.g. glue) between light source and beam shaper.

This situation is shown in FIG. 9b. The illustration in FIG. 9b corresponds substantially to the one in FIG. 9a or also that in FIG. 4, so that a detailed description can be omitted here. The beam unit 220 shown in FIG. 9b differs from that shown in FIG. 9a substantially in that now, instead of an air gap between source or OLED substrate 240 and beam former 100, an index-matched glue 360 is introduced as the index-matched contact material instead of the air gap between the beam shaper 100 and the OLED substrate 240 of the area light source 250.

Regarding the question as to whether, in the case of a specific implementation of a beam unit 220, consideration of an air gap 350 compared to the use of refraction index-matched contact materials might lead to better, i.e. more desirable, results, physical implications resulting from this might have to be considered. As has already been explained above, there are different options for mounting the beam shaper 100 on a respective area light source 250 or the associated substrate 240.

In the case of directly mounting the beam shaper 100 on the area light source, wherein an air gap exists between the source and the beam shaper, a maximum angular divergence of $$\Theta_{div} = \arcsin\left(\frac{1}{n_{beam}}\right) \quad (4)$$

results for the light entering the beam shaper according to the law of refraction, wherein $n_{beam}$ is the refraction index of the beam shaper material. Due to the limited angular divergence, which is caused by the fact that the sine can assume a maximal value of 1 in the law of refraction, comparatively little light will enter into the adjacent channels, depending on the thickness of the spacing layer 330, such that typically comparatively little extraneous light will result.

Considering the fact that no coupling-out optics exist on the area light source 250 (e.g. the substrate structure 240 of the organic light emitting diode shown in FIG. 9a), only that light can be used, which leaves the area light source without coupling-out optics. This could result in a reduction of the usable amount of light. However, the reflectivity of an area light source without coupling-out optics is frequently higher than with such a coupling-out structure, so that an effective "recycling process" due to multiple reflection of light between the beam shaper and the area light source might have a compensating effect.

The situation illustrated in FIG. 4, where the beam shaper 100 is mounted on the area light source with additional coupling-out optics, e.g. a pyramid array, wherein an air gap is formed between the coupling-out optics 260 and the beam shaper 100, does not differ with respect to the situation discussed above in FIG. 9a with regard to the maximum angular divergence of light according to equation (4). Hence, in this situation also relatively little extraneous light results. However, due to the additional coupling-out optics 260, more light is extracted from the area light source 250, wherein, compared to the above-described variants, the light recycling process would probably be less efficient.

In the case as illustrated in FIG. 9b, where the beam shaper 100 is mounted in an index-matched manner on an area light source such that no air gap exists between source and beam shaper, the beam shaper 100 acts both as beam-shaping and as coupling-out element. If, for example, the beam shaper 100 is mounted on the OLED substrate 240 by means of the index-matched glue 360, the beam shaper 100 might use a larger portion of light of the area light source. However, due to the divergence angle of the beams of the beam shaper no longer limited by equation (4), the beam shaper will have the effect that more extraneous light can result when the beams pass through the adjacent lenses.

In other words, due to the now possibly larger divergence angle, light passing through an intensity-modulating structure 125 might impinge on a refractive element 130 of an indirectly or directly adjacent beam-shaping element 110.

The selection of one of the above-named variations depends on many parameters that ultimately depend on the specific application requirements.

A further option is the implementation of an edge minor coating. Analogously to a completely reflective housing, both the beam shaper 100 and the area light source 250 or the associated substrate 240 can be provided with a mirror coating on the edges.

Figure 10A:
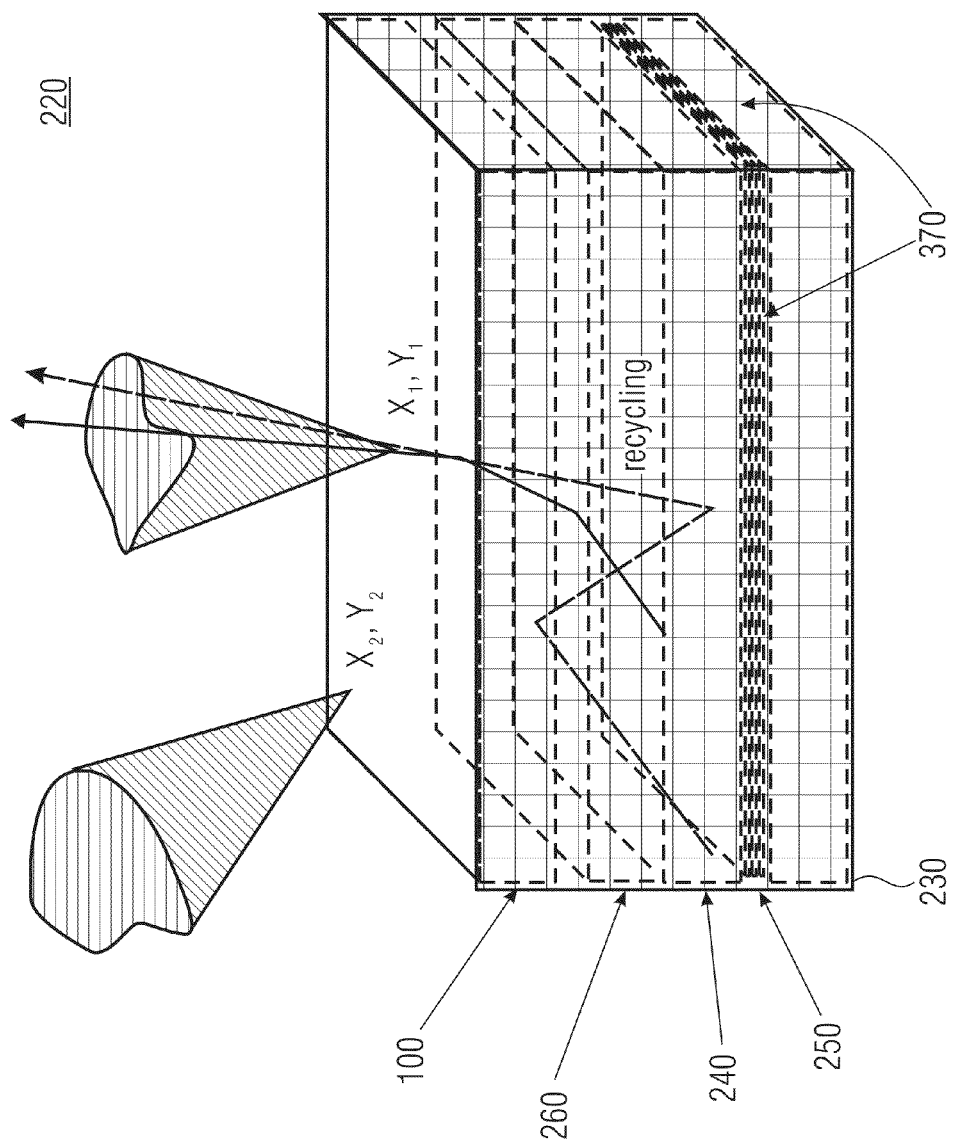
FIG. 10a shows the embodiment shown in FIG. 4 with additional edge mirror coating.

FIG. 10a shows such an embodiment of a beam unit 220 having a beam shaper 100 according to an embodiment of the present invention comprising a respective edge minor coating. The beam unit 220 of FIG. 10a corresponds essentially to the beam unit shown in FIG. 4, wherein, however, sidewalls of the beam unit 220 are coated by means of an edge mirror coating layer 370. Thereby, beams that would leave the beam unit 220 on the side without edge minor coating layers 370 will be reflected back to the inside of the beam unit 220, which can result in increased coupling out of light via the beam shaper 100.

Figure 10B:
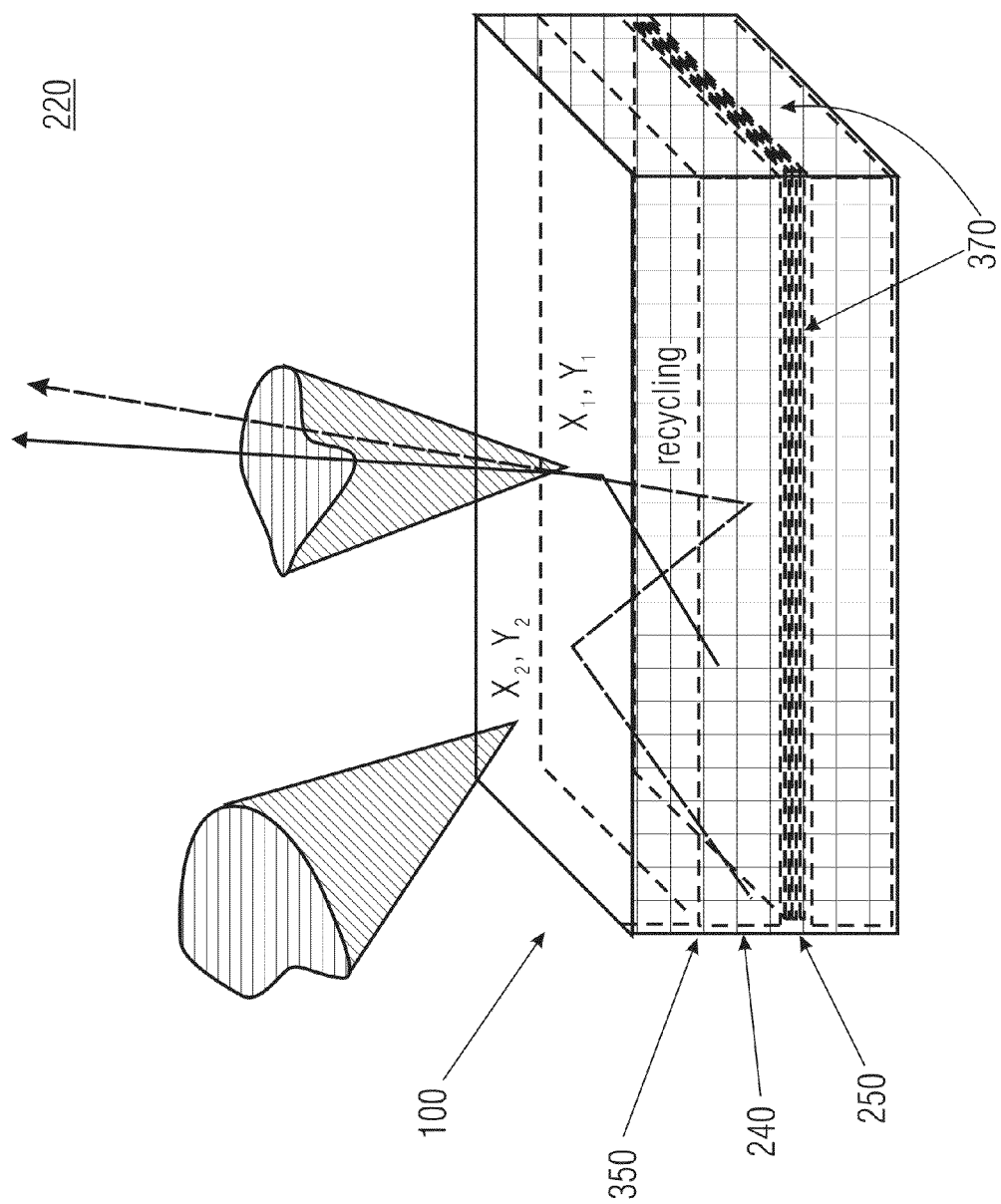
FIG. 10b shows schematically the embodiment shown in FIG. 9a with edge mirror coating.

FIG. 10b shows a further embodiment of a beam unit 220 having a beam shaper 100 according to an embodiment of the present invention. The beam unit 220 shown in FIG. 10b is the beam unit shown in FIG. 9a, where the sidewalls are coated with the edge minor coating 370. Analogously to the beam unit 220 shown in FIG. 10a, there is thus also in this case the option of preventing light at least partly from exiting on the side and mirroring the respective light back to the beam unit 220.

Figure 10C:
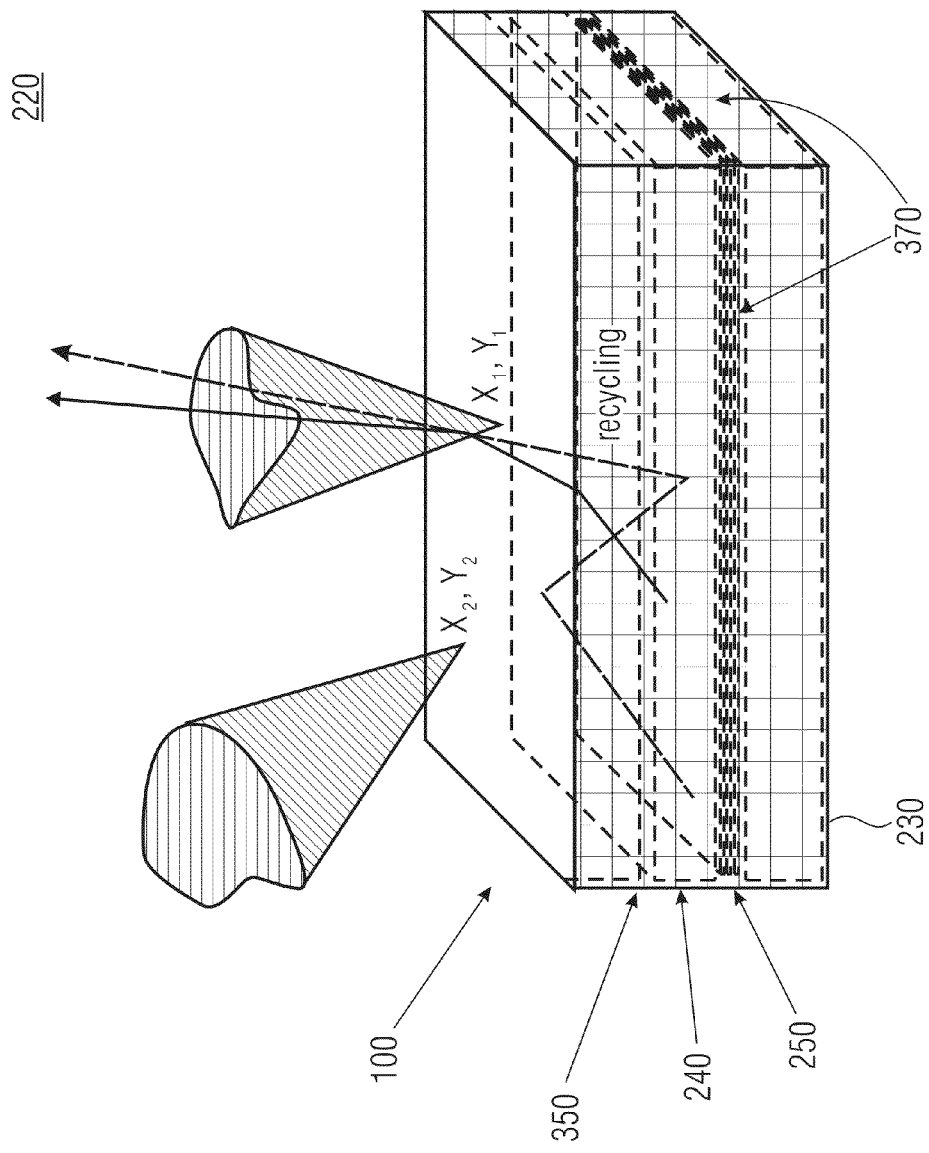
FIG. 10c shows schematically the embodiment shown in FIG. 9b with edge minor coating.

FIG. 10c shows a third embodiment of a beam unit 220 with a respective edge minor coating of area light source and beam shaper. The beam unit 220 shown in FIG. 10c essentially corresponds to that shown in FIG. 9b, wherein here again the side walls of the beam unit 220 are coated with an edge mirror coating layer 370. This also prevents, at least partly, light or radiation from exiting on the side.

For the case that the beam shaper generates a desired intensity distribution in the far field, there is the option of performing a transformation of the far field into the near field. Optionally, a further optical element, such as a lens array, can be used for transforming far-field distributions into near-field distributions. A near-field distribution differs from a far-field distribution in that in near-field distribution a light distribution is defined and generated at a predetermined spacing from the source or the beam shaper.

Figure 11:
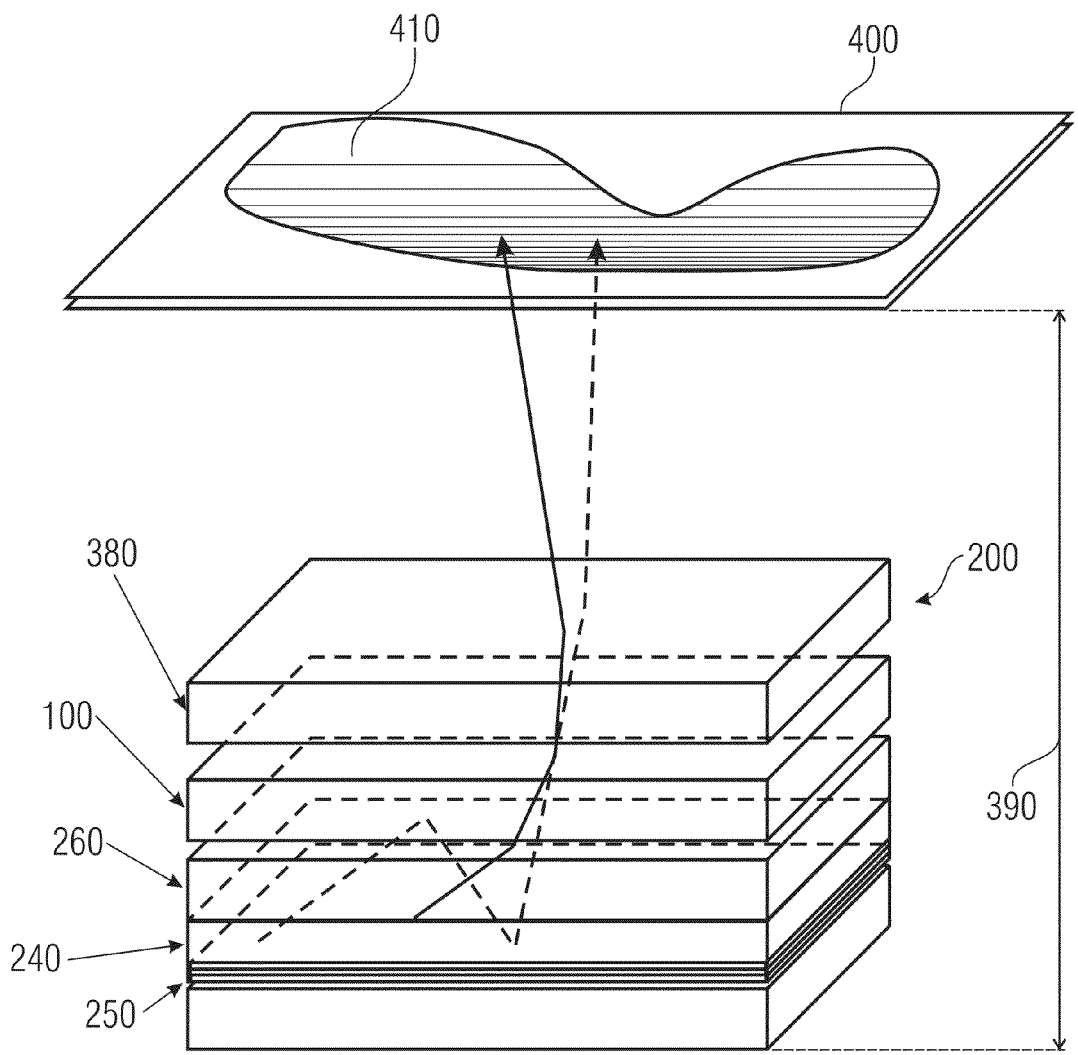
FIG. 11 shows an embodiment of a beam shaper with a light source according to an embodiment of the present invention with additional transformation optics.

For illustrating this in more detail, FIG. 11 shows a beam unit 220 essentially corresponding to the beam unit shown in FIG. 4, but additionally comprising transformation optics 380 on a side of the beam shaper 100 facing away from the OLED substrate 240. The transformation optics 380 also referred to as the transformation element 380, effects the respective transformation of the imaging from the far field to the near field. The transformation optics 380 is frequently referred to as part of the so-called secondary optics, which takes over the actual imaging. Thus, the beam shaper 100 according to an embodiment of the present invention is also part of the secondary optics.

While a far-field distribution is basically "focused" on an image plane, which is at infinity, the transformation optics 380 effects imaging into a closer image area 400 lying within a predetermined spacing 390. This results in a light distribution 410 in the image area 400, as is defined, for example, by the beam shaper 100. Here, the image area can basically be formed in any manner, i.e. can comprise different spacings from the beam shaping sections. One example of an image area 400 is an image plane, as illustrated, for example, in FIG. 11. The same applies for illumination areas and illumination levels, also referred to as illumination targets.

The mode of operation of a beam shaper 100 according to an embodiment of the present invention as well as of beam units 220 comprising a respective beam shaper 100 will be described based on their abstract mode of operation and their specific mode of operation.

When describing the abstract mode of operation, part of the light radiated by the light source will pass directly through the intensity-modulating structure 125, for example in the form of an aperture opening, of the individual beam-shaping elements 110. With exclusively absorbing apertures, the residual light portion will be completely absorbed. With reflective apertures, where the reflective aperture portion is typically arranged on the source side, the residual light will at least be partly recycled by multiple reflection between aperture and potentially reflective source or reflective housing, so that the respective light has the chance of reaching an aperture opening after multiple reflection. The light passing through the intensity-modulating element is finally modified in an appropriate manner by the following refractive element.

Figure 12:
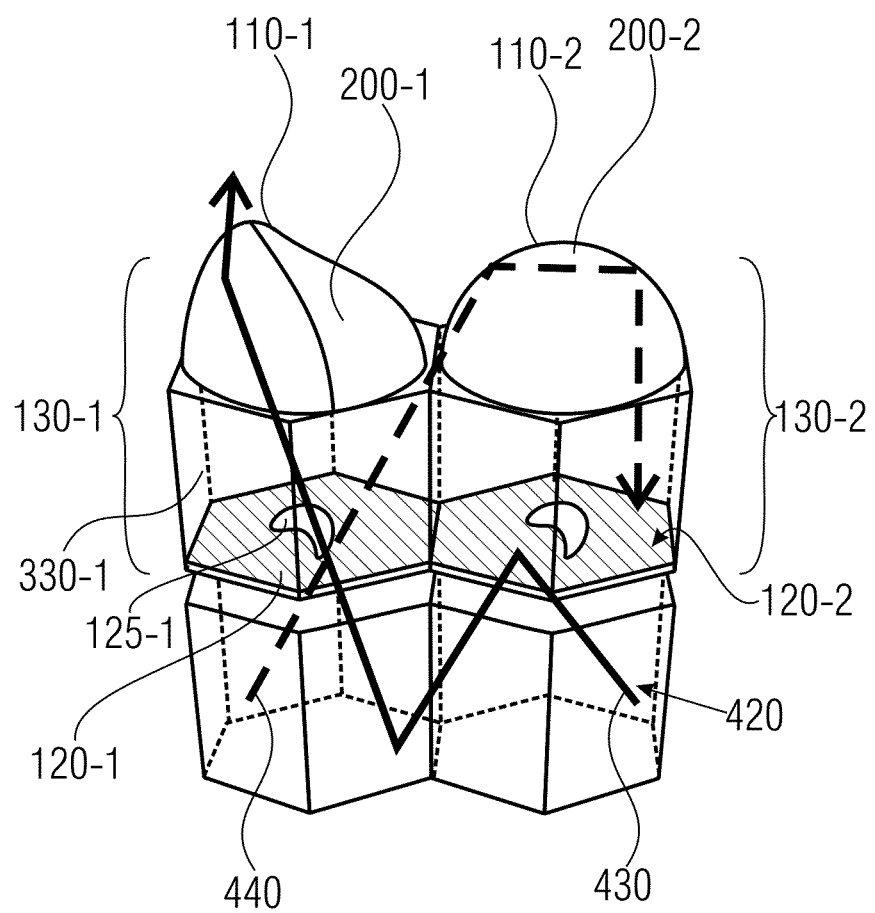
FIG. 12 shows schematically two beam-shaping elements according to an embodiment of the present invention.

This is shown schematically in FIG. 12, which shows an arrangement of two beam-shaping elements 110-1, 110-2 of different types according to an embodiment of the present invention. Here, the beam-shaping element 110-1 has a refractive element 130-1, comprising an optical free-form element 200-1 apart from a spacing layer 330-1. In contrast, the beam-shaping element (beam-shaping channel) 110-2 comprises a refractive element 130-2 having a spherical or semi-spherical lens 200-2 and a spacing layer 330-1. The two spacing layers 330-1 and 330-2 can, for example, be formed by a common substrate.

Further, both beam-shaping elements 110-1, 110-2 comprise apertures as intensity-modulating elements 120-1, 120-2, which comprise an absorbing aperture layer facing the refractive elements 130 and a reflective aperture layer facing away from the refractive elements 130. In addition to that, FIG. 12 also shows, for the two beam-shaping elements 110-1, 110-2, respective sections of a reflective area light source 420.

If the light source 420 now emits a first light beam 430 and the same hits the aperture 120-2 in the area of the reflective layer, the same will be reflected back to the reflective light source 420 and reflected again from the same. Here, the first light beam 430 has left the area of the second beam-shaping element 110-2 and has reached the area of the first beam-shaping element 110-1. By reflection at the reflective light source 420 in the area of the first beam-shaping element 110-1, the first light beam 430 is reflected through the aperture opening 125-1 to the refractive element 130-1. There, it impinges on the optical free-form element 200-1 and can thus leave the first beam-shaping element 110-1. Thus, the first light beam 430 illustrates light recycling by multiple reflections at the reflective aperture and the reflective light source.

In contrast to this, a second light beam 440 is emitted by the light source 420 and penetrates the aperture opening 125-1 of the first aperture 120-1 at an angle, so that the second light beam 440 leaves the area of the first beam-shaping element 110-1. In the following, the second light beam 440 hits a surface of the second lens 200-2 of the second beam-shaping element 110-2 twice at an angle, so that the same is totally reflected in both cases. Thereby, the second light beam 440 is reflected in the direction of the absorbing aperture layer of the aperture 120-2 and is absorbed by the same. Due to the fact that the second light beam 440 has left the light source at such an angle that the same could pass the aperture opening 125-1 of the first beam-shaping element 110-1, but not the optical free-form element 200-1 of the respective beam-shaping element, the second light beam 440 has to be considered as extraneous light. Thus, this second light beam illustrates a possible elimination of extraneous light by the absorbing aperture.

Regarding the abstract mode of operation, the aperture openings, i.e. the intensity-modulating structures 125 of the intensity-modulating elements 120 in the respective channels or beam-shaping elements 110 in the aperture exit level determine a spatial light distribution, since the aperture thickness can be assumed to be sufficiently small for the existence of an aperture level under the prerequisite of using typical thin-layer processes. By the downstream refractive element 130, this light distribution is transformed into an associated power density distribution in every channel having channel indices i, k. Thus, an angle-dependent radiation pattern can be allocated to every channel (i, k), which is given by $$\frac{dP_{i,k}}{d\Omega dA_{i,k}} = B(X_i, Y_k, \Theta, \Phi), \quad (5)$$

wherein $\Delta A_{i,k}$ represents the respective channel area. Thus, within wide limits, an almost random, discretized radiation characteristic according to the beam shaper can be generated. Merely for completeness' sake, it should be noted that equation (5) is based on an orthogonal arrangement of channels 110. In the case of a channel distribution, the X and Y coordinates of the channels both depend on i and on k.

As has already been discussed in the context of FIG. 12, the occurrence of extraneous light can be minimized or completely eliminated by an absorptive aperture or an absorptive layer within the intensity-modulating element 120. Thus, on the one hand, light can be reflected or totally reflected at the refractive element 130, as has been illustrated in FIG. 12. On the other hand, light leaving the beam shaper in an extremely oblique manner can impinge on refractive elements of adjacent channels and ultimately be drawn back again into the beam shaper. This is also illustrated in FIG. 12. These light contributions, which can lead to extraneous light, are mostly eliminated when they impinge on the absorptive aperture.

With regard to the specific mode of operation, there are basically two different types of beam shapers according to embodiments of the present invention. In the first beam-shaping type, optical imaging of the spatial light distribution is effected after the intensity-modulating element by the refractive element. This comprises, on the one hand, imaging into a predetermined illumination area with a finite spacing to the beam shaper. On the other hand, Fourier imaging is also possible, i.e. transformation of the spatial light distribution after the intensity-modulating element into an angular distribution and hence into the far field. This type of beam shaper will be called "(Fourier) imaging beam shaper" in order to illustrate both realization options. The same applies for the associated transformation process: "(Fourier) imagings".

In the case of the second beam-shaping type, the so-called free-form beam shaper, a free form is used as the refractive element and normally no optical imaging of the spatial light distribution is effected after the intensity-modulating element. Optionally, in this case, the same can also be attached downstream.

In the case of a (Fourier) imaging beam shaper 100, the refractive element 130 is substantially given by a convex spherical or aspherical lens 200, which is mounted on a spacing layer 330, which is also referred to as spacer layer. The lens 200 effects approximately a (Fourier) imaging of the aperture geometry, i.e. the spatial light distribution is transformed into an angle or intensity distribution after the aperture opening, as it is given by the intensity-modulating element 120 and the intensity-modulating structure 125. In other words, in the Fourier imaging beam shaper 100, the lens 200 transforms the spatial light distribution into a far-field distribution. On the other hand, in the imaging beam shaper, the spatial light distribution is transformed into an intensity distribution in a predetermined image plane or a general illumination area after the intensity-modulating structure. Thus, the aperture geometry in every channel having the channel indices (i, k) determines the shape of the radiation pattern according to equation (5).

Thus, circular apertures result in circular far fields, while triangular apertures form respective triangular far fields. A respective offset of the aperture towards the optical axis of the refractive element 130 results in a deflection of the light distribution. This is also illustrated in more detail in FIG. 13.

Figure 13:
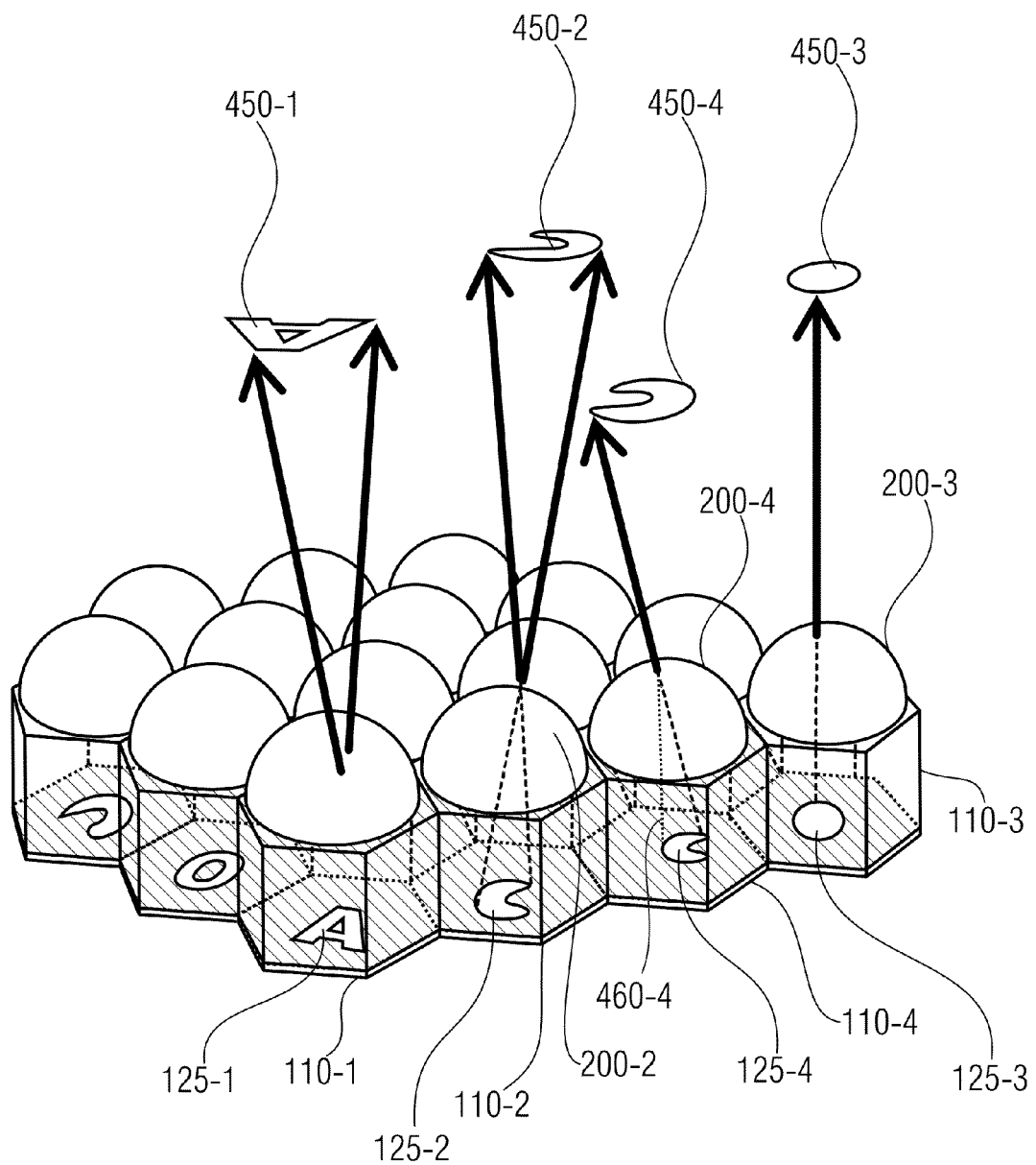
FIG. 13 shows schematically a beam shaper according to an embodiment of the present invention, where the beam-shaping elements approximately generate a Fourier image (far image) or image (image plane) of the aperture.

FIG. 13 shows a (Fourier) imaging beam shaper 100 according to an embodiment of the present invention having a hexagonal channel geometry. Every channel 110 of the beam shaper 100 generates approximately one (Fourier) image in the image plane or in the far field of the aperture opening.

The plurality of beam-shaping elements 110 differs from the intensity-modulating elements 120 in the shape of the geometry of the apertures. The beam-shaping element 110-1 comprises an A-shaped aperture opening 125-1, which is imaged into a respective image 450-1 in the far field in a respective passage of light through the aperture opening 125-1. Correspondingly, the beam-shaping element 110-2 comprises a crescent-shaped aperture opening 125-2, which is correspondingly transformed into a respective image 450-2 in the far field by a lens 200-2. Analogously, in the case of the beam-shaping element 110-3, the circular aperture opening 125-3 is transformed into a circular image 450-3 by the lens 200-3.

In addition to this, FIG. 13 shows, within the fourth beam-shaping element 110-4, the case that the aperture opening 125-4, which is also crescent-shaped, is laterally offset with respect to an optical axis 460-4 of the lens 200-4 of the respective beam-shaping element. Thereby, the generated image 450-4 of the aperture opening 125-4 is accordingly also projected laterally from an extension of the optical axis.

The light distribution or light power distribution within a radiation pattern or a radiation cone as well as the steepness of the intensity drop outside the radiation pattern are determined by a transmission function of the refractive element 130. Here, the transmission function depends, among other things, on imaging errors of thickness lenses, asphericities of the lenses and a thickness of the spacing layer 330 (thickness of the spacer layer), the so-called de-focus. Thus, no (Fourier) imaging in the narrow sense results, but a (Fourier) image modified by the transmission function, whereby the intensity distribution within the radiation cones can be controlled to a certain extent. The modified (Fourier) image does not only specifically adjust a radiation cone channel by channel, but also concentrates the light in this radiation cone. I.e., an intensity increase results due to light concentration.

The thickness of the spacing layer 330, i.e. the spacer layer, should be selected for a relatively focused image of the aperture with a respective steep intensity drop such that the aperture is in the proximity of the paraxial lens focal width f (Fourier imaging beam shaper) or that a lens-aperture spacing is adjusted according to the law of imaging (imaging beam shaper). However, in the case of strongly diverging light-source distributions, a relatively large portion of light passing through the aperture of a specific channel will enter into an adjacent channel. Thus, a specific amount of extraneous light results.

The extraneous light portion can be minimized by different measures. For example, the extraneous light can be partly suppressed by above-described absorptive channel-separating walls. Further, a smaller lens-aperture spacing or a smaller spacing of the refractive element 130 can reduce the extraneous light portion from the intensity-modulating element 120. With a smaller lens-aperture spacing, an increased "washout" of the far-field distribution results. This is illustrated in more detail in FIG. 14.

Figure 14A:
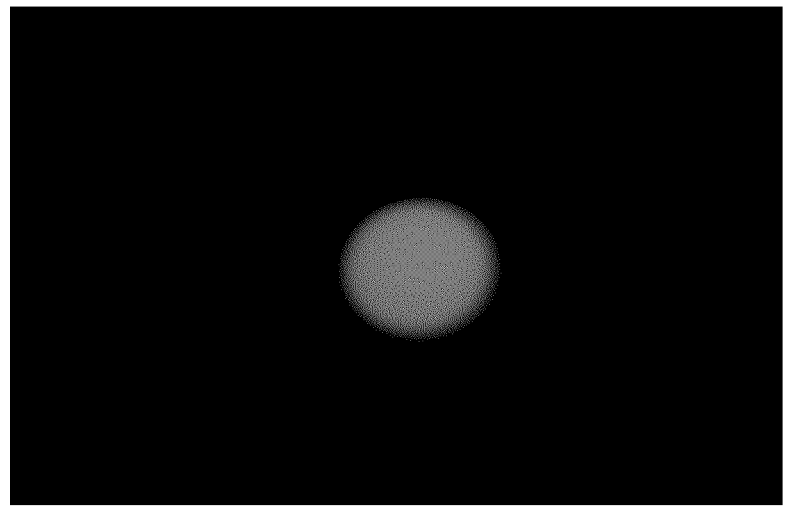
FIG. 14a and FIG. 14b illustrate different light distributions by Fourier images of a circular aperture structure for different aperture-lens spacings.
Figure 14B:
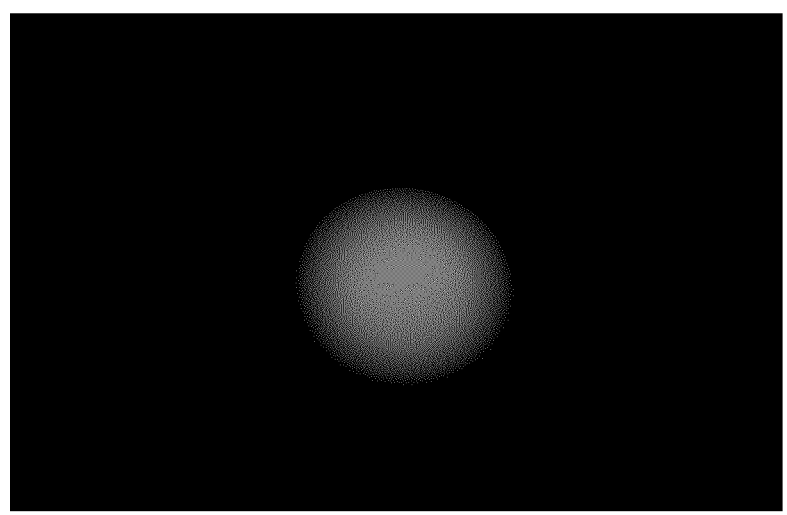

FIG. 14a shows the imaging of a circular light distribution by means of a (Fourier) imaging of a circular aperture structure with an aperture-lens spacing corresponding to 0.7 times the paraxial focal width f of the respective lens. Correspondingly, FIG. 14b shows a respective image where an aperture-lens spacing only has 0.5 times the paraxial focal width. Here, FIG. 14b shows a clearly more "washed-out" edge limitations as the image in FIG. 14a.

FIG. 14 thus illustrates that, by varying the lens-aperture spacing or the spacing of the refractive element 130 from the intensity-modulating element 120, the amount of extraneous light and of "washout" of the far-field distribution can be specifically controlled and adapted to the respective application requirements. Thicknesses of the spacing layer 330 in the range of approximately 0.4 times the paraxial focal width f up to the paraxial focal width f itself frequently provide results corresponding to the requirements (0.4×f to 1×f).

Lens parameters (such as lens radii) normally result from generally known design requirements (imaging scale/aberrations) for (Fourier) imagings. This applies in particular to light source distribution having a not too large divergence. For light source distributions having large beam angle divergence, it is of advantage to use lenses having small focal widths in order to obtain good minimization of extraneous light. For some cases it is even advantageous when the lens radius R and a typical channel diameter P have the following relation to each other:

$$R \approx P/2 \quad (6)$$

This means that lenses having an approximately hemispherical structure are to be favored in some applications. Thereby, it can be achieved, for example, that as small a portion of light as possible enters into the adjacent channels, that very oblique beams and hence a specific portion of light of the adjacent channels remains in the beam shaper due to total reflection and is eliminated by the optional absorptive aperture, and very oblique extraneous light beams are effectively drawn back into the beam shaper. By using apertures reflective on the source side or intensity-modulating structures and elements reflective on the source side, there is additionally the possibility of obtaining an intensity exaggeration. If, in contrast, merely absorbing apertures or respective absorbing intensity-modulating elements are used, the diverging light passing through the apertures is transferred into the associated acceptance angle range or radiation cone by the refractive structure. However, an insignificant light power is not used for imaging due to the absorption. In other words, an angular divergence of light concentration exists, so that light power in the order of $(1-A_{arp}/A_{cha})$ occurs as a result of the absorption, wherein $A_{arp}$ illustrates an area of the aperture opening and $A_{cha}$ illustrates a size of the channel or beam-shaping element 110.

By using apertures reflective on the source side and reflective area light sources or also sources in reflective housings, at least part of this light is recycled by multiple reflection. Thereby, an intensity increase is obtained by the combination of two effects, light recycling and angular light concentration by the refractive element.

Apart from power losses by non-perfect reflection during the recycling process, i.e. due to reflection values of less than 1 (R<1), additionally, light can get lost in unwanted directions through the edges of the beam shaper and the area light source, i.e. for example through the edge of substrates of organic light emitting diodes. For area light sources having relatively small areas, such power losses can definitely assume significant values.

For a square area light source having a side length L and a common height H of the beam shaper and the area light source, in every reflection an edge loss in the order of approximately 2 H/L can exist. For minimizing such losses, edge minor coatings of the beam shaper and/or of area light sources can definitely be useful, as has already explained in the context of FIGS. 10a to 10c. In other words, analogously to a completely reflective housing, an edge mirror coating of the beam shaper and/or the light source can have a counter-effect.

In addition to that, there is the option to freely scale the geometries within wide ranges. When changing all geometry parameters, i.e. lens radii, channel sizes, aperture parameters and other respective parameters by a random constant factor, the optical effect of the beam shaper remains the same, as long as, in the case of a reduction, the wavelength of the respective radiation does not reach the order of magnitude of the aperture openings. Thus, the geometry parameters of the beam shaper are all in all scalable within wide limits. Maximum dimensions in the range below one millimeter are frequently desirable to allow easy visibility of the respective individual structures.

In the following, different application examples are described where the beam shaper according to embodiments of the present invention can be applied. These include, for example, beam shaping, but also illuminations and signalings.

As a first application example, there is, for example, the option of implementing different radiation cones of the individual beam-shaping elements that are matched per channel. By systematically adjusting different parameters and types of the individual beam-shaping elements, a light radiation pattern matched per channel can be obtained, as has already been shown, for example, in FIG. 13. Here, variations of the types or the parameters underlying the channels can be effected from channel to channel. Also, the channels can be varied randomly or systematically by a specific value (per-channel parameter chirp) or can be implemented by respective variations with respect to different areas. Thereby, both a per-channel adjustment of the shapes of the radiation patterns and a per-channel adjustment of the light deflections can be obtained. When using the same channel geometries, the per-channel discretization of the light distribution allows a far-field pattern that is almost independent of the spatial intensity distribution of the source. However, this might necessitate that the single channel dimensions are smaller than typical lengths for spatial intensity changes of the source distribution.

Figure 15A:
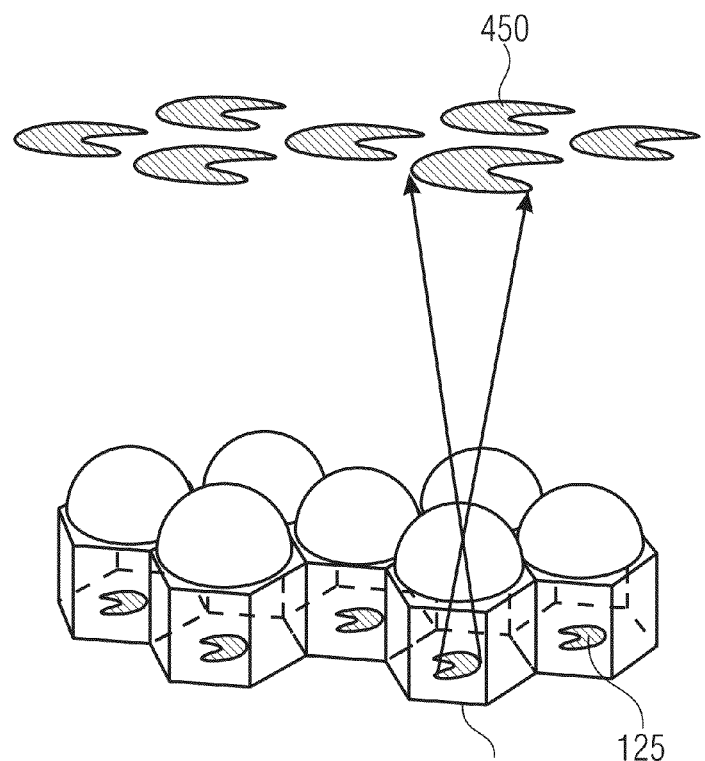
FIG. 15a and FIG. 15b illustrate combined light deflection and beam shaping by an offset of the aperture to the optical axis of lenses with lens-aperture centering (a) and lens-aperture offset (b) according to embodiments of the present invention.
Figure 15B:
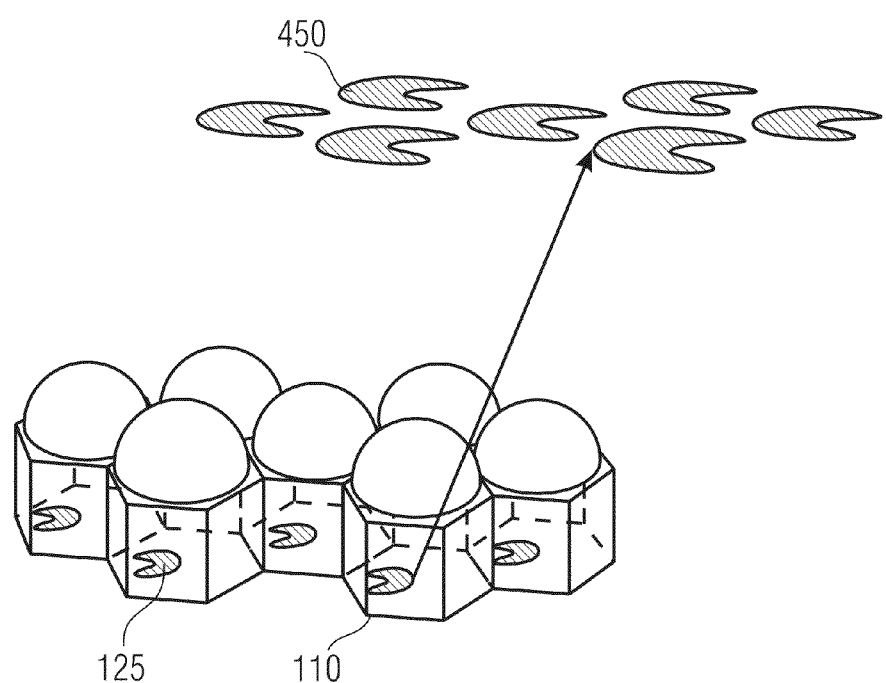

As has already been explained in the context of FIG. 13 and the beam-shaping element 110-4 shown there, there is the option to obtain both beam shaping and light deflection by offsetting the aperture with respect to the optical axis of the refractive lenses. FIGS. 15a and 15b illustrate this for different partial areas of a beam shaper 100 according to an embodiment of the present invention.

FIG. 15a shows a plurality of beam-shaping elements 110 of a first type, while FIG. 15b shows respective beam-shaping elements 110 of a second type. Both types differ in that the aperture openings 125 of the beam-shaping elements 110 of the second type in FIG. 15b are offset with respect to an optical axis not shown in FIGS. 15a and b. This results in a common offset of images 450 in the beam-shaping elements 910 of the second type (FIG. 15b) compared to the first type (FIG. 15a).

In other words, the two partial images 15a and 15b illustrate the effect of a combined light deflection and beam shaping by an offset of the aperture openings 125 through an optical axis of the lenses in every channel not shown in the figures. The beam cones of the single channels overlap in the far field to the far image, wherein, in partial image a, radiation is effected perpendicular to the beam shaper by a lens-aperture centering, while, in partial image b, radiation is effected obliquely to the beam shaper by a lens-aperture offset.

By the constant offset of the apertures with respect to the optical axis of the refractive lenses, beam shaping and effective light deflection is obtained. In a lens-aperture offset, more light will reach the adjacent channel than in lens-aperture centering. Thus, it might be more relevant to use absorbing apertures in light deflection in order to minimize generation of extraneous light. In comparison to light deflections with conventional prism arrays as coupling-out structures, light deflection with such beam shapers is generally both more efficient and associated with less interfering light.

Within a further application example, beam shapers according to an embodiment of the present invention can also be used for a combination of beam shapings and light concentration in a finite image plane. By specific parameter variation or parameter chirp, there is the option to not only obtain light concentration into the individual radiation cones, but the radiation cones of the single channels can also be made to overlap at a defined spacing.

Figure 16:
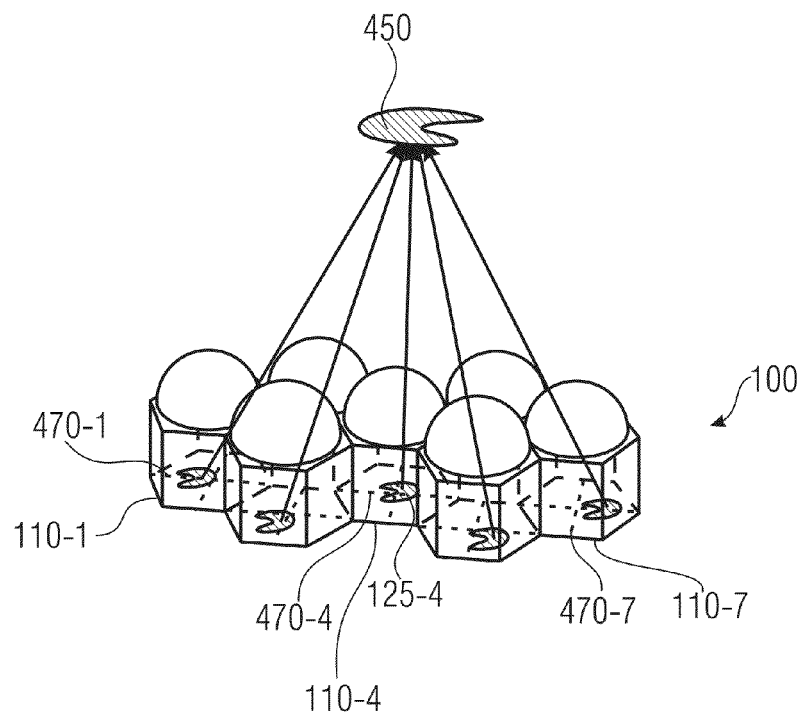
FIG. 16 illustrates a superposition of different beams from different beam-shaping elements by a specific variation of the position of the aperture opening in different beam-shaping elements according to an embodiment of the present invention.

FIG. 16 shows a respective beam shaper where, for simplifying the illustration, merely seven beam-shaping elements 110-1 to 110-7 are shown. The seven beam-shaping elements 110-1 to 110-7 belong to seven different types, which differ by a variation or a chirp of the lens-aperture offset.

In order to explain this in more detail, FIG. 16 shows a projection of the optical axis or a piercing point of the optical axis into the level of the aperture by cross wires 470-1 to 470-7 for each of the seven illustrated beam-shaping elements 110. For example, an aperture opening 125-4 of the beam-shaping element 110-4 is central to a center of the cross wires 470-4, while with increasing spatial spacing from the position of the fourth beam-shaping element 110-4, a spacing of the respective aperture opening 125 from the center of the associated cross wires 470 increases.

Thus, FIG. 16 illustrates that a concentration of all light cones on the same area of a predetermined image plane, where a common image 450 of all beam-shaping elements 110 lies, is possible. The specific variation of the position of the aperture openings 125 within the channels 110, which ultimately results in the overlap of the individual light distributions at a predetermined spacing to the beam shaper 100, can be described by an optionally at least per-area constant, differentiable or constantly differentiable functional context (function) into which information of a position of the respective beam-shaping element 110 is entered. In the case of the beam shaper 100, as is shown in FIG. 16, such a function results from the lens imaging laws applicable to the individual beam-shaping elements 110, where corrections by lens errors or other effects might be considered.

A further application example, which is very similar to that shown in FIG. 16, will be described below in the context of FIG. 17. This concerns the generation of a far- or near-field distribution by overlapping or superposing different radiation cones. By overlapping different shapes and/or sizes of light cones from different beam-shaping elements in the far field or in a specific image plane, complicated light distributions can be generated systematically.

Figure 17:
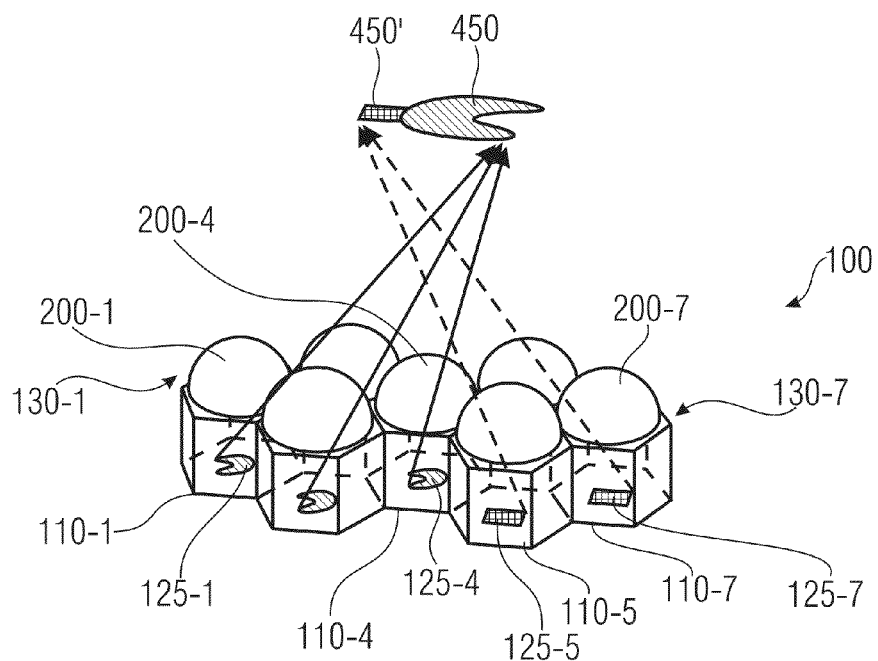
FIG. 17 illustrates more complex imaging by means of different apertures of the intensity-modulating elements where beams from different beam-shaping elements intersect at least one point.

FIG. 17 shows a beam shaper 100 having seven beam-shaping elements 110-1 to 110-7 belonging to different types. The beam-shaping elements 110-1 to 110-4 differ from each other mainly by a position of the associated aperture openings 125-1 to 125-4 to the refractive elements 130-1 to 130-4 or the respective lenses 200-1 to 200-4. Similarly to the structure of the beam shaper 100, as is shown in FIG. 16, the spacings are varied such that the beams of the different beam-shaping elements 110 meet at a common point in the image plane at a finite spacing and there generate an image or partial image 450 corresponding to the aperture shapes 125.

In addition to that, the beam shaper 100, however, comprises further beam-shaping elements 110-5 to 110-7 which also differ from each other with respect to the position of the aperture openings 125 to those of the refractive elements 130. Additionally, the types of this subgroup of beam-shaping elements 110 also differ with respect to the shape of the aperture openings 125. While the beam-shaping elements 125-1 to 125-4 are crescent-shaped and thus generate a respective crescent-shaped image 450, the aperture openings 125-5 to 125-7 have a square shape. Correspondingly, a second partial image 450' results in the image plane, which represents an image of the respective aperture openings 125.

The beam shaper 100 according to an embodiment of the present invention illustrated in FIG. 17 allows a complicated, basically random image boundary with intensity curves that can be generated by overlapping light distributions of the different beam-shaping channels 110, both in the far field and in a finite image plane. In addition, there is, of course, also the possibility of focusing different beam-shaping elements 110 on different image planes. Thus, for example, within a beam shaper 100 according to an embodiment of the present invention, groups of beam-shaping elements that each might comprise different types of beam-shaping elements can generate images in different image planes.

Figure 18:
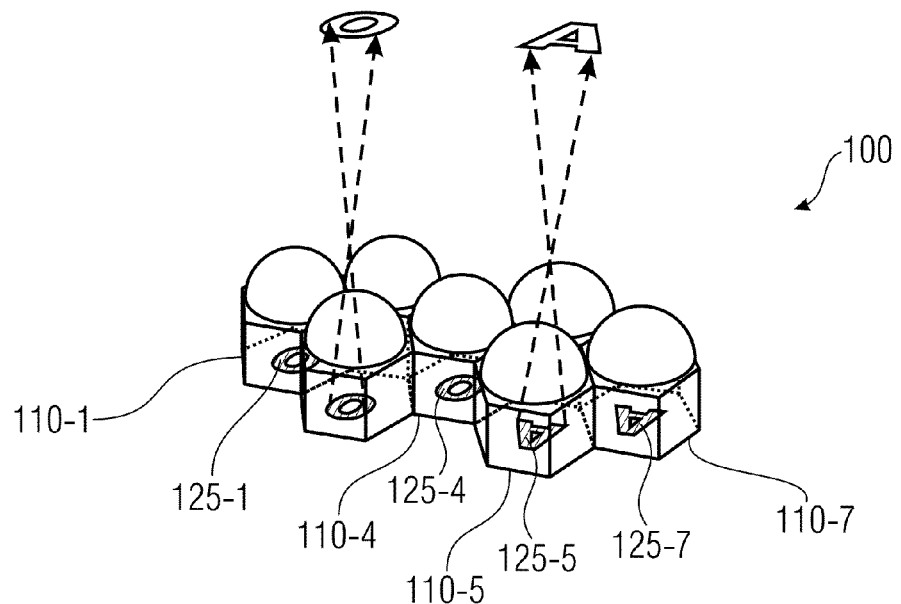
FIG. 18 illustrates imaging of a beam shaper according to an embodiment of the present invention for generating lettering in the far field or an image or illumination level.

A further application example of a beam shaper according to an embodiment of the present invention is illustrated in the context of FIG. 18. This concerns the generation of light distribution by different areas of identical channels, which can be used, for example, for generating lettering. A beam shaper 100 according to an embodiment of the present invention as shown in FIG. 18 can thus comprise areas of identical channels or beam-shaping elements 110, wherein the different areas generate different light distributions with possibly different shapes and/or different deflections. Thus, the beam shaper 100 shown in FIG. 18 again comprises seven beam-shaping elements 110-1 to 110-7, of which the beam-shaping elements 110-1 to 110-4 belong to a first type, while the beam-shaping elements 110-5 to 110-7 belong to a second type. The two types differ with respect to the shape of aperture openings 125-1 to 125-7. While the aperture openings 125-1 to 125-4 have an O-shaped shape, the aperture openings 125-5 to 125-7 comprise A-shaped aperture openings 125. Correspondingly, the first group of beam-shaping elements 110 generates an "O" in the far field, while the second group of beam-shaping elements 110 generates an "A" in the far field.

Thereby, it is, for example, possible to generate lettering in the far field or in an image plane by respectively varying the offset of the positions of the aperture openings with respect to the refractive element 130 by means of an area light source. Of course, this embodiment of a beam shaper 100 is also not limited to generating lettering in the far field or at a predetermined image plane. Rather, any other complex illustrations, such as logos or pictures, can be generated.

Apart from the above-explained (Fourier) imaging beam shapers, beam shapers according to embodiments of the present invention can also be implemented in the form of free-form beam shapers, as has been explained above. Here, the refractive elements comprise at least partly corresponding free-from portions.

In other words, contrary to the (Fourier) imaging beam shapers, the refractive element of at least one beam-shaping element is implemented based on a free form. Thus, the refractive element of the beam-shaping element, contrary to the (Fourier) imaging beam shaper, does not generate an approximate (Fourier) image of the light distribution after the aperture opening. In the (Fourier) imaging beam shaper, merely the shape of the boundary and/or the deflection of the radiation cone of every channel is specifically controlled by (Fourier) imaging. This control of the intensity distribution within the radiation cone is to a certain extent possible by modifying asphericity and defocus, however, with free forms significantly more random distributions in the radiation cone can be obtained.

Thus, by using a free form it is, for example, possible to transfer a point of the aperture opening into a completely random intensity distribution. This applies both to the far field and to any illumination areas that are also referred to as illumination targets. The overall distribution of a channel then results from the superposition of the intensity patterns of all points in the aperture opening.

Figure 19:
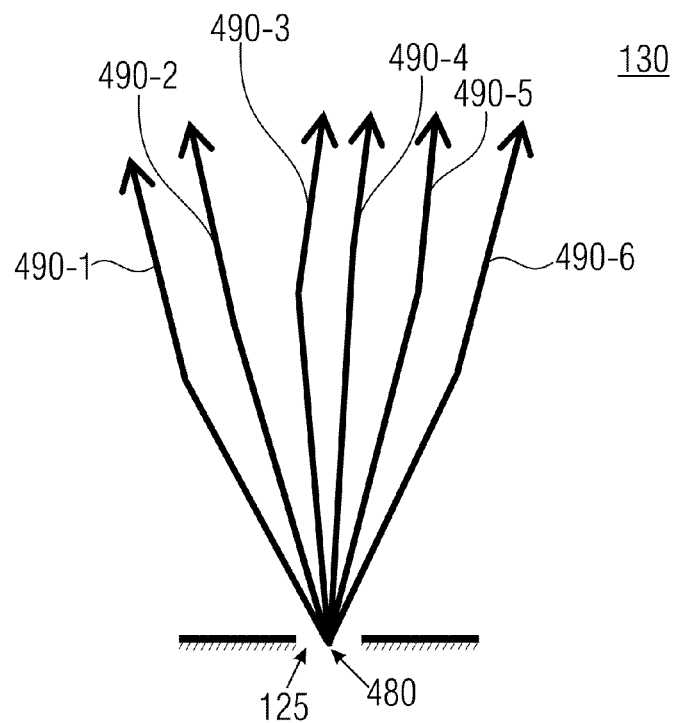
FIG. 19 illustrates the mode of operation of a beam-shaping element having a refractive free-form element.

In order to explain this in more detail, FIG. 19 illustrates a refractive element 130 based on a free form. Starting from a point 480 in the aperture opening 125, FIG. 19 illustrates, based on six beams 490-1 to 490-6 the option of generating a fairly freely designable radiation cone from this one point 480.

The mode of operation of such a free-form beam shaper is hence based in particular on the free designability of the free-form elements. Depending on the intended structural size, different production techniques can be used. Thus, it is, for example, possible to produce free-form beam shaper shapes in the range of 10 μm up to several 100 μm by means of laser lithography or even by ultra-precision processing. Also, the production of respective free-form shapers by means of so-called gray-scale electron beam lithography is possible. In the case of larger structures (typically starting from 50 μm), ultra-precision processing can be used for master generation. Replications are possible by the above-named replication techniques, such as UV shaping, hot stamping, injection molding and other methods.

In the above-described embodiments based on (Fourier) imaging lenses, the same can generally also be replaced by optical free forms. Here, merely with respect to the wording, it has to be considered that, due to the low or missing symmetry of the free forms, in many cases, no "optical axis" in the narrow sense exists. Correspondingly, the above-named points and descriptions for (Fourier) imaging beam shapers according to embodiments of the present invention apply accordingly also to respective free-form beam shapers according to embodiments of the present invention.

In summary, beam shapers according to embodiments of the present invention allow a compact and efficient generation of complex radiation characteristics according to equation (1) of a luminous area by means of per-channel (Fourier) imaging or free-form beam shaping. This compact structure results not only in that beam shapers according to embodiments of the present invention can be produced as thin elements based on thin-layer techniques. As light sources, here both area light sources and light sources having small dimensions can be used in reflective housings or assemblies of small light sources.

Embodiments of the present invention in the form of beam shapers frequently have in common that the same allow a per-channel discretized (Fourier) imaging or a per-channel discretized free-form beam shaping of aperture openings of almost any form and arrangement.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. Beam shaper for a light source arrangement for generating a radiation profile, comprising:
    a multitude of adjacently arranged optical beam-shaping elements,
    wherein the beam-shaping elements each belong to one type of a plurality of different types of beam-shaping elements with different optical characteristics, the different types of beam-shaping elements generate respective light distributions in a far field or in a finite image target when illuminated;
    wherein the beam-shaping elements, when illuminated together, generate the radiation profile of the beam shaper by a superposition of the respective light distributions of the different types of beam-shaping elements; and wherein the beam-shaping elements each comprise an intensity-modulating element and a refractive element associated with the intensity-modulating element, the refractive element arranged downstream of the intensity-modulating element with respect to an optical path of the beam-shaping elements.

2. Beam shaper according to claim 1, wherein a first and a second type of the plurality of different types of beam-shaping elements differ from each other at least with respect to at least one of the following features: a shape or size of the beam-shaping element, a height or a spacing of the intensity-modulating element from the refractive element, a shape or size of an intensity-modulating structure of the respective intensity-modulating element, a position of the intensity-modulating structure of the intensity-modulating element with respect to a position of the refractive element, an implementation of an edge area between two adjacent beam-shaping elements and a shape or size of the refractive element.

3. Beam shaper according to claim 1, wherein the beam-shaping elements of the multitude of beam-shaping elements are directly adjacent to each other.

4. Beam shaper according to claim 1, wherein the beam-shaping elements of the multitude of beam-shaping elements are arranged irregularly, at least in parts in a one-dimensional or two-dimensional manner.

5. Beam shaper according to claim 1, wherein the intensity-modulating elements of the beam-shaping elements comprise at least a reflective or absorbing layer, a reflective or absorbing layer system or a reflective or absorbing structured layer system.

6. Beam shaper according to claim 5, wherein the intensity-modulating elements comprise a reflective layer, a reflective layer system or a reflective structured layer system and an absorbing layer, an absorbing layer system or an absorbing structured layer system, wherein the absorbing layer, the absorbing layer system or the absorbing structured layer system face the refracting element, and the reflective layer, the reflective layer system or the reflective structured layer system face away from the refractive element.

7. Beam shaper according to claim 1, wherein the refractive elements further comprise a spacing layer facing the intensity-modulating element.

8. Beam shaper according to claim 1, wherein the beam-shaping elements comprise at least parts of a common substrate of the beam shaper.

9. Beam shaper according to claim 1, wherein a beam-shaping element of the multitude of beam-shaping elements is separated from an immediately adjacent beam-shaping element by a separating structure.

10. Beam shaper according to claim 9, wherein the separating structure comprises a reflective or absorbing separating layer between the immediately adjacent beam-shaping elements.

11. Beam shaper according to claim 10, wherein the reflective or absorbing separating layer is implemented as a wall mirroring for optically isolating the immediately adjacent beam-shaping elements.

12. Beam shaper according to claim 1, wherein the beam-shaping elements comprise an additional transparent layer, which abuts on the intensity-modulating element on a side facing away from the refractive element.

13. Beam shaper according to claim 1, wherein the refractive element is implemented such that beams that do not immediately pass through the intensity-modulating element of the beam-shaping element of the refractive element are at least partly totally reflected towards the intensity-modulating element.

14. Beam shaper according to claim 1, wherein at least part of the multitude of beam-shaping elements is implemented such that different beams passing through different beam-shaping elements intersect in an image area at a predetermined spacing from the beam shaper to generate at least part of the radiation profile in the image area.

15. Beam shaper according to claim 1, wherein at least part of the multitude of beam-shaping elements is implemented such that different beams passing through different beam-shaping elements leave the beam shaper in parallel to generate at least part of the radiation profile in the far field.

16. Beam shaper according to claim 1, wherein the different optical characteristics of at least part of the plurality of types of beam-shaping elements and locations of the beam-shaping elements determine radiation characteristics of the beam shaper.

17. Beam shaper according to claim 1, further comprising a light source arranged on a side of the intensity-modulating elements facing away from the refractive elements of the multitude of beam-shaping elements.

18. Beam shaper according to claim 17, comprising an air gap or a refractive index-matched contact material between the light source and the intensity-modulating element.

19. Beam shaper according to claim 17, wherein the light source is an organic light emitting diode.

20. Beam shaper according to claim 17, wherein the light source and the beam shaper are arranged in a housing reflective to the inside.

* * * * *